United States Patent [19]
Iizuka

[11] Patent Number: 5,541,760
[45] Date of Patent: Jul. 30, 1996

[54] SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 361,382

[22] Filed: Dec. 22, 1994

[30] Foreign Application Priority Data

Dec. 22, 1993 [JP] Japan .................. 5-325354
Apr. 1, 1994 [JP] Japan .................. 6-065255

[51] Int. Cl.⁶ .................................. G02B 26/08
[52] U.S. Cl. ................ 359/207; 359/205; 359/206; 347/259
[58] Field of Search ........................ 359/205, 206, 359/207, 216–220; 347/225, 256, 258, 259

[56] References Cited

U.S. PATENT DOCUMENTS

| | | | |
|---|---|---|---|
| 4,715,699 | 12/1987 | Morimoto | 359/206 |
| 4,859,011 | 8/1989 | Takanashi | 359/207 |
| 4,930,850 | 6/1990 | Morimoto | 359/207 |
| 4,953,926 | 9/1990 | Morimoto | 359/207 |
| 4,998,790 | 3/1991 | Iizuka et al. | 359/207 |
| 5,130,840 | 7/1992 | Iima et al. | 359/220 |
| 5,148,304 | 9/1992 | Kawabata | 359/207 |
| 5,162,938 | 11/1992 | Iima et al. | 359/216 |
| 5,179,465 | 1/1993 | Kondo | 359/218 |
| 5,200,850 | 4/1993 | Iizuka et al. | 359/206 |
| 5,343,325 | 8/1994 | Yamakawa | 359/205 |

FOREIGN PATENT DOCUMENTS 4110817 4/1992 Japan .
4277715 10/1992 Japan .

*Primary Examiner*—Paul M. Dzierzynski
*Assistant Examiner*—Darren E. Schuberg
*Attorney, Agent, or Firm*—Greenblum & Bernstein

[57] ABSTRACT

A scanning optical system has a beam of light which is deflected by a light deflector and which scans a scanning surface along a main scanning direction through a scanning lens system. The scanning lens system includes an anamorphic lens made of glass which has a positive power in both the main scanning direction and in a sub-scanning direction perpendicular to the main scanning direction. The positive power in the sub-scanning direction is larger than the positive power in the main scanning direction. Also included is a plastic lens having an aspherical surface in the main scanning direction.

12 Claims, 30 Drawing Sheets

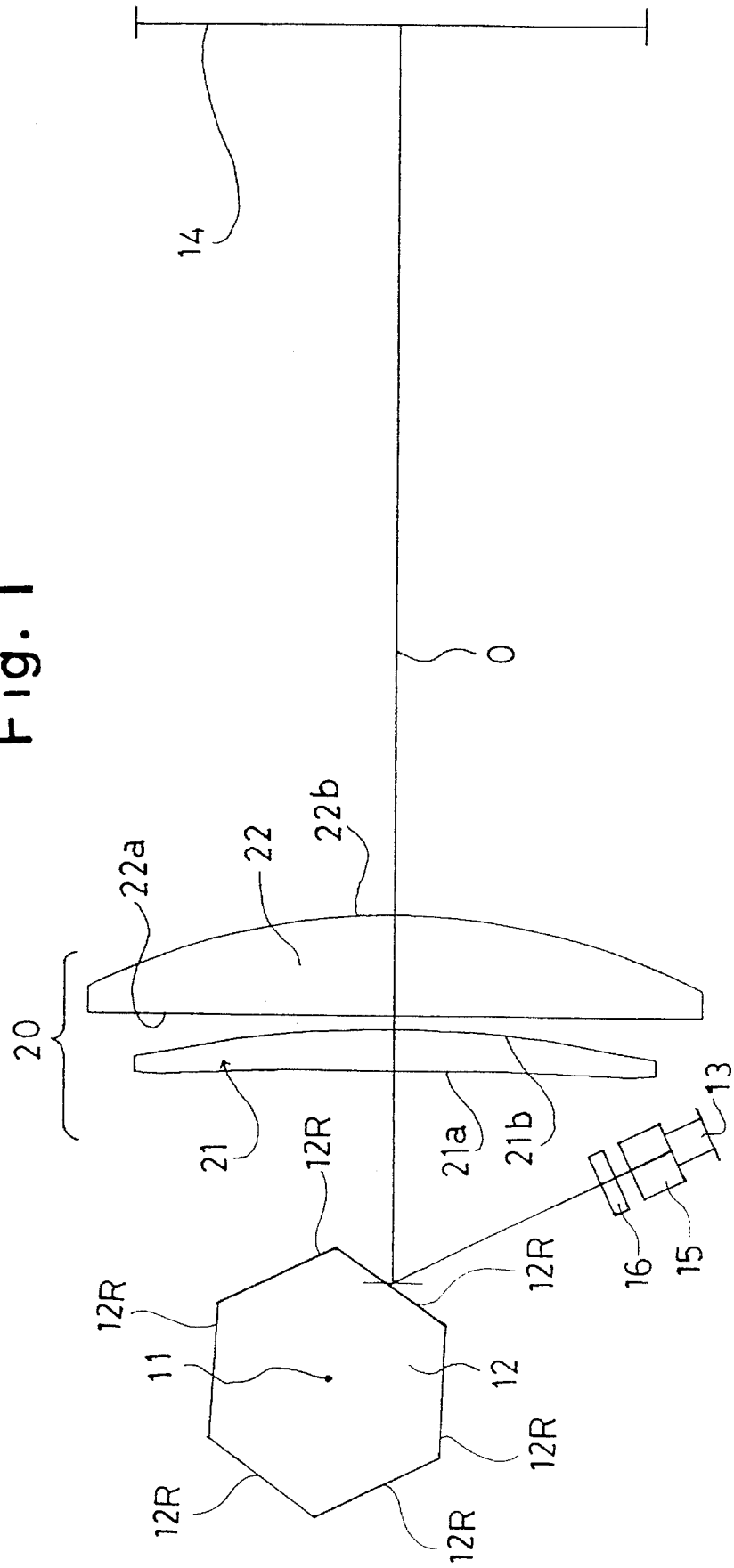

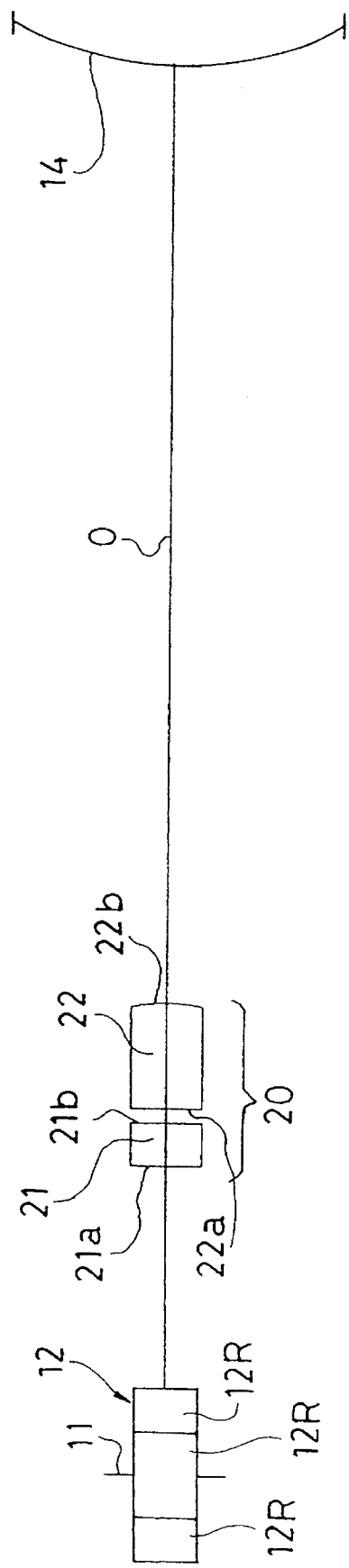

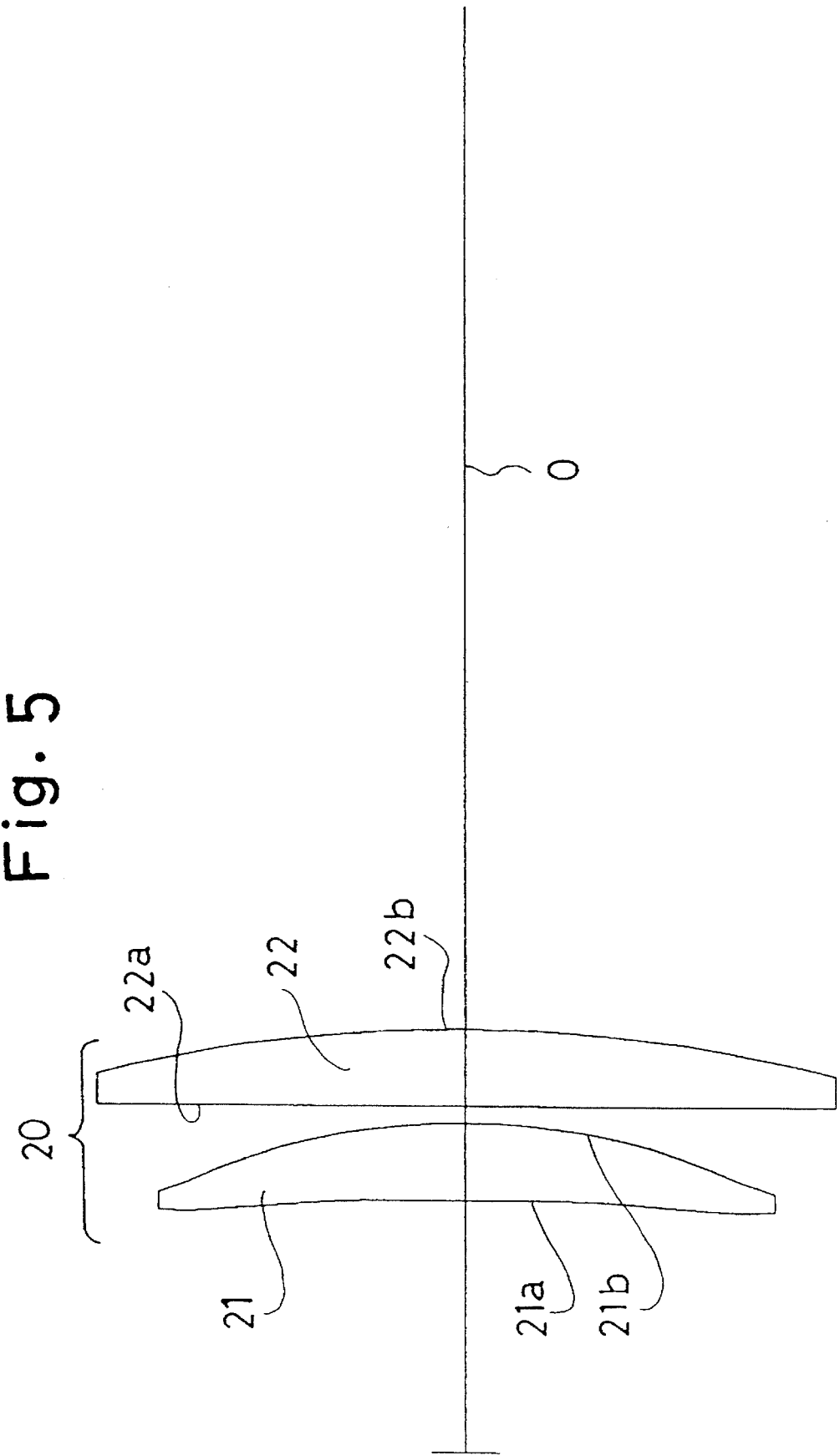

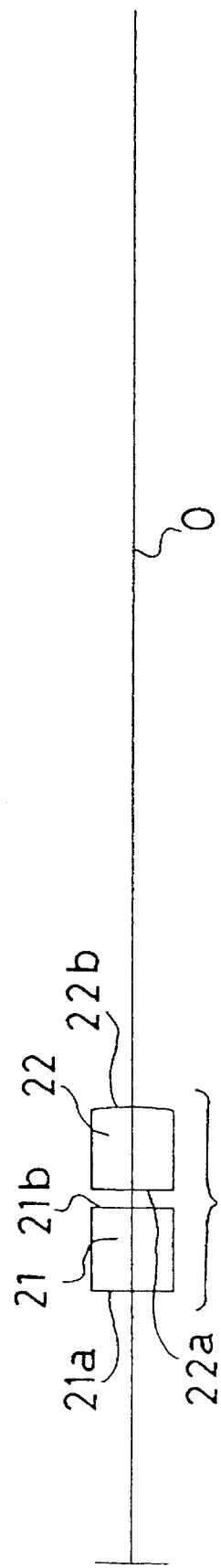

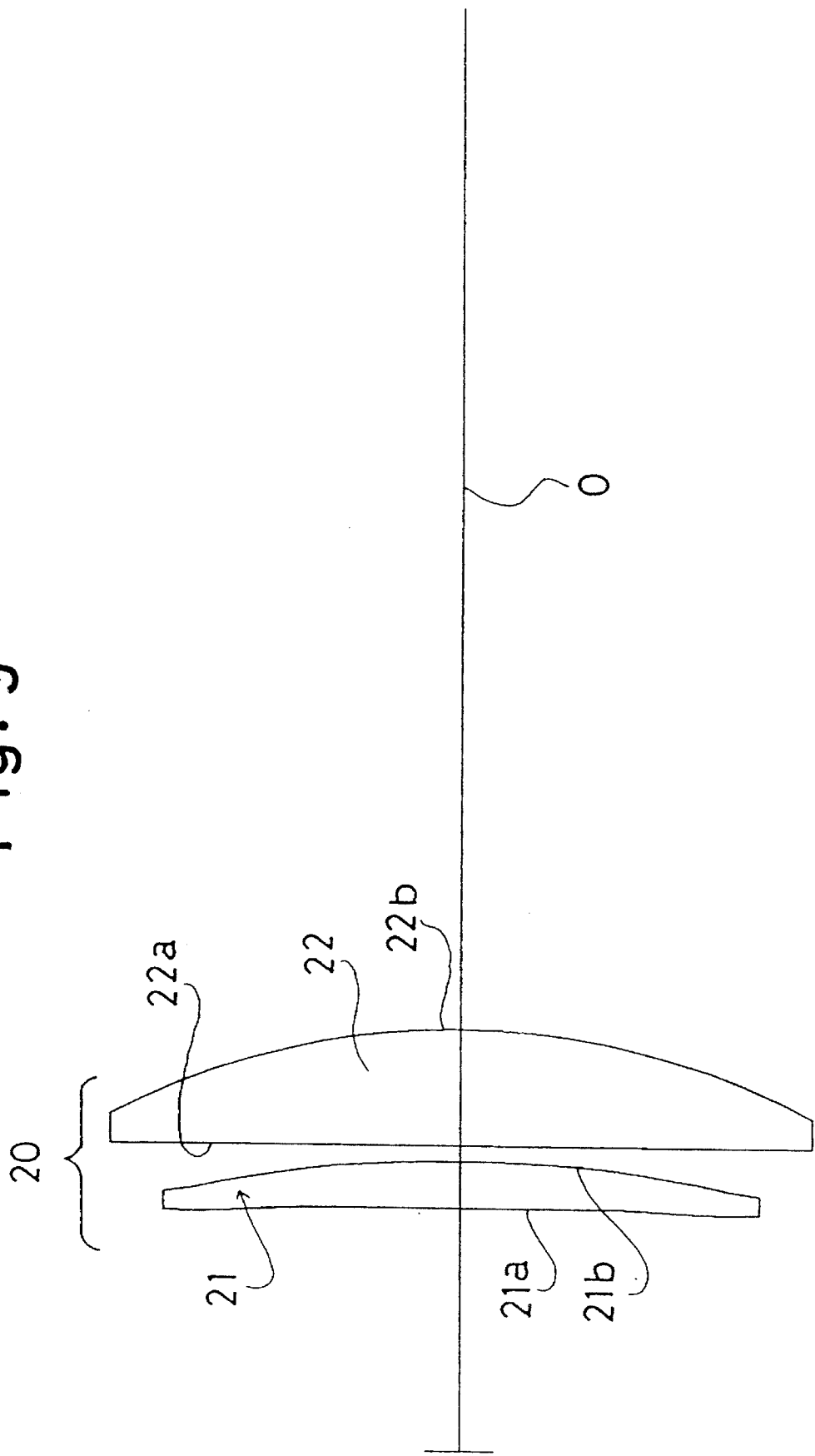

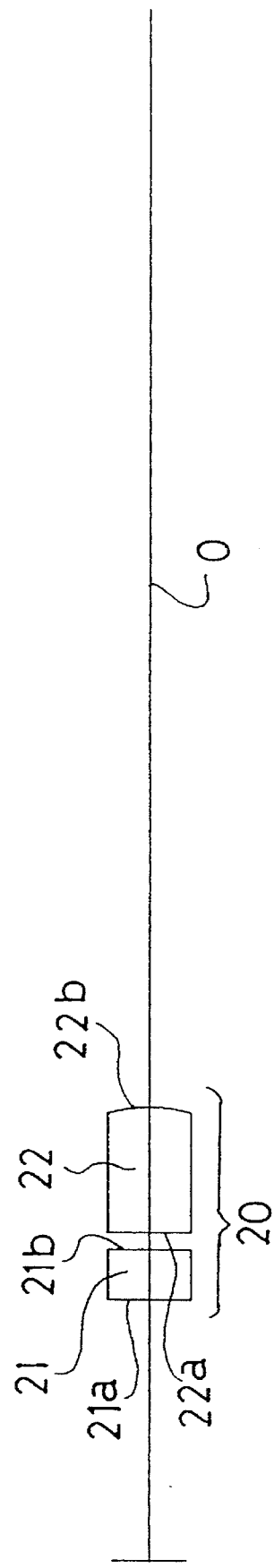

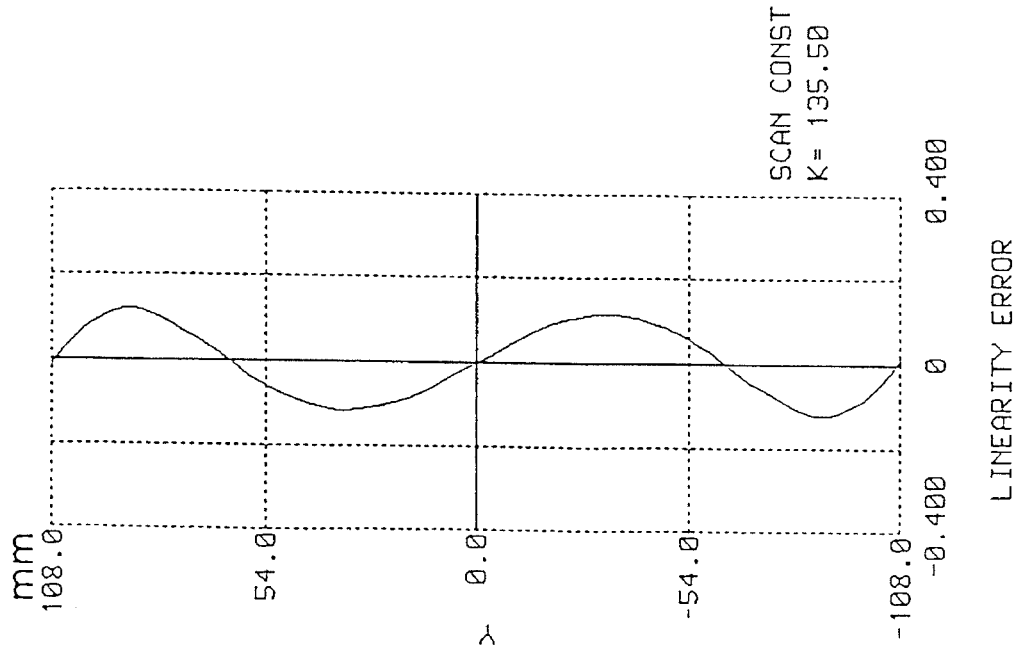

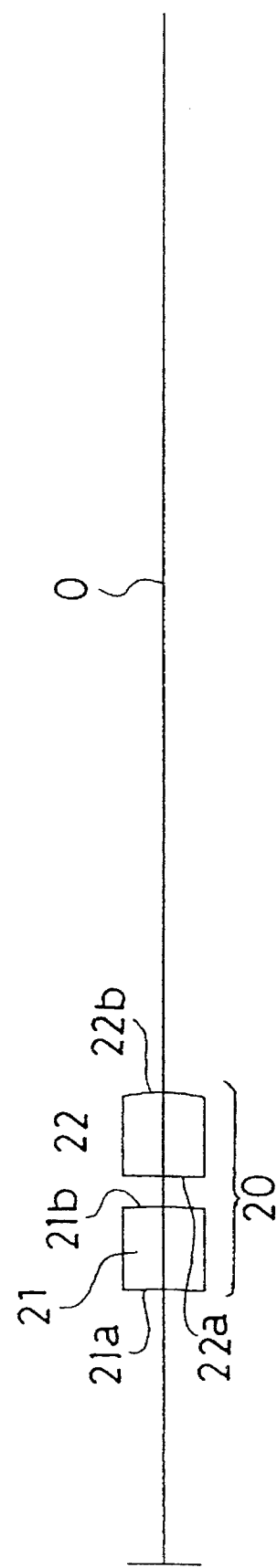

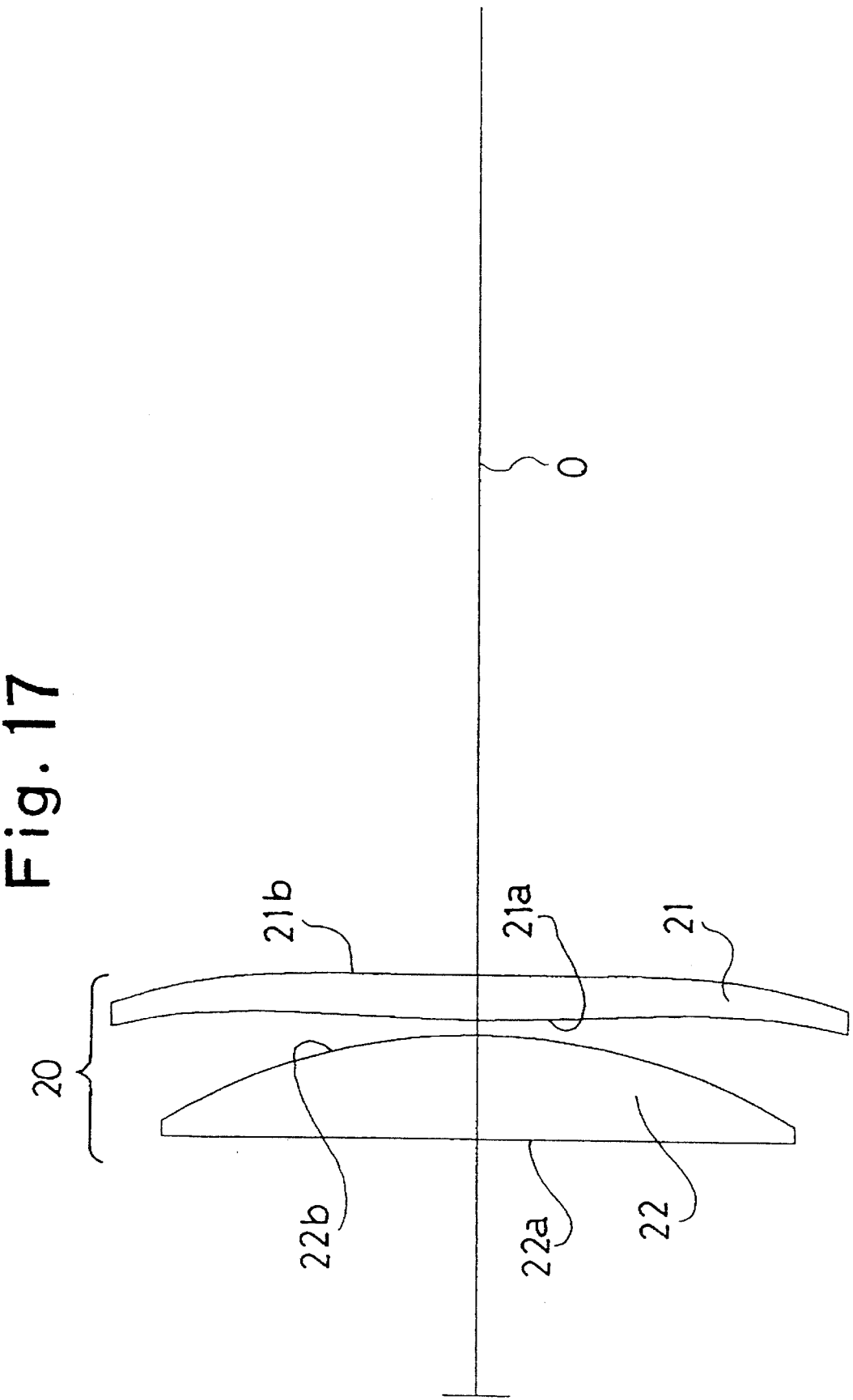

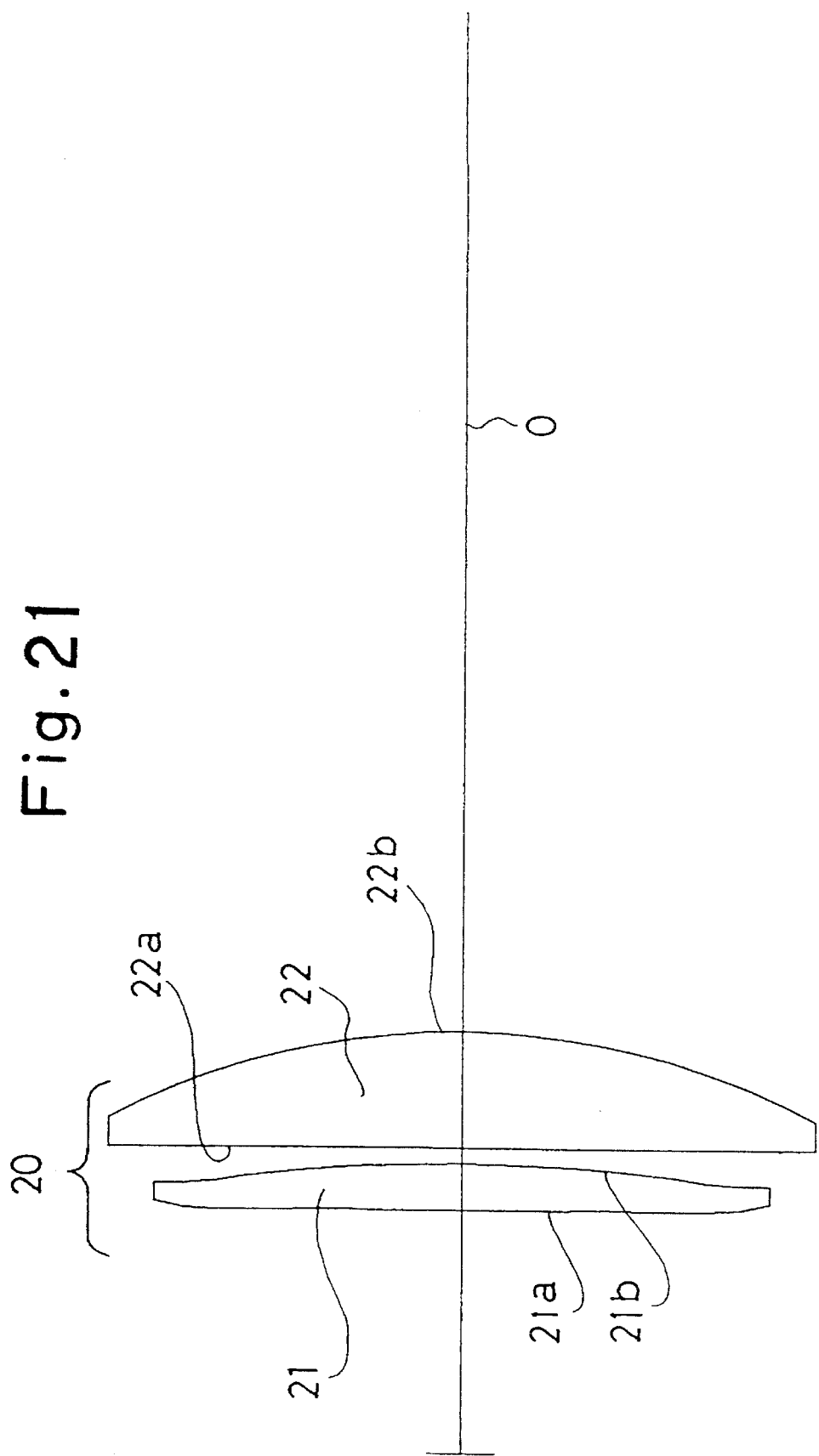

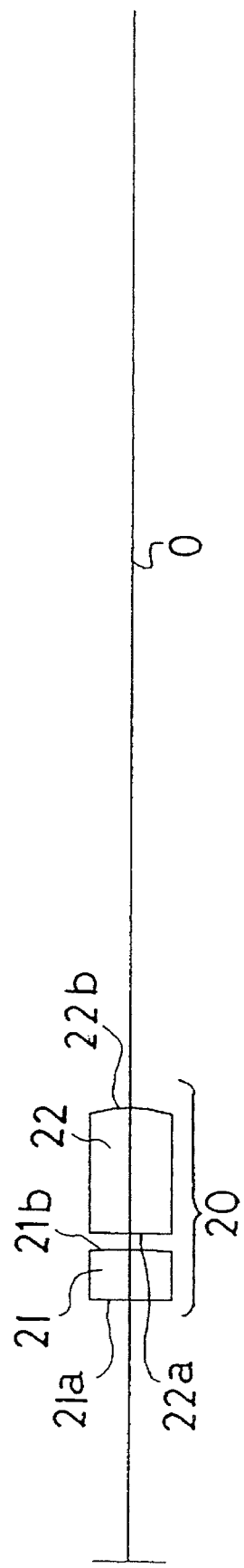

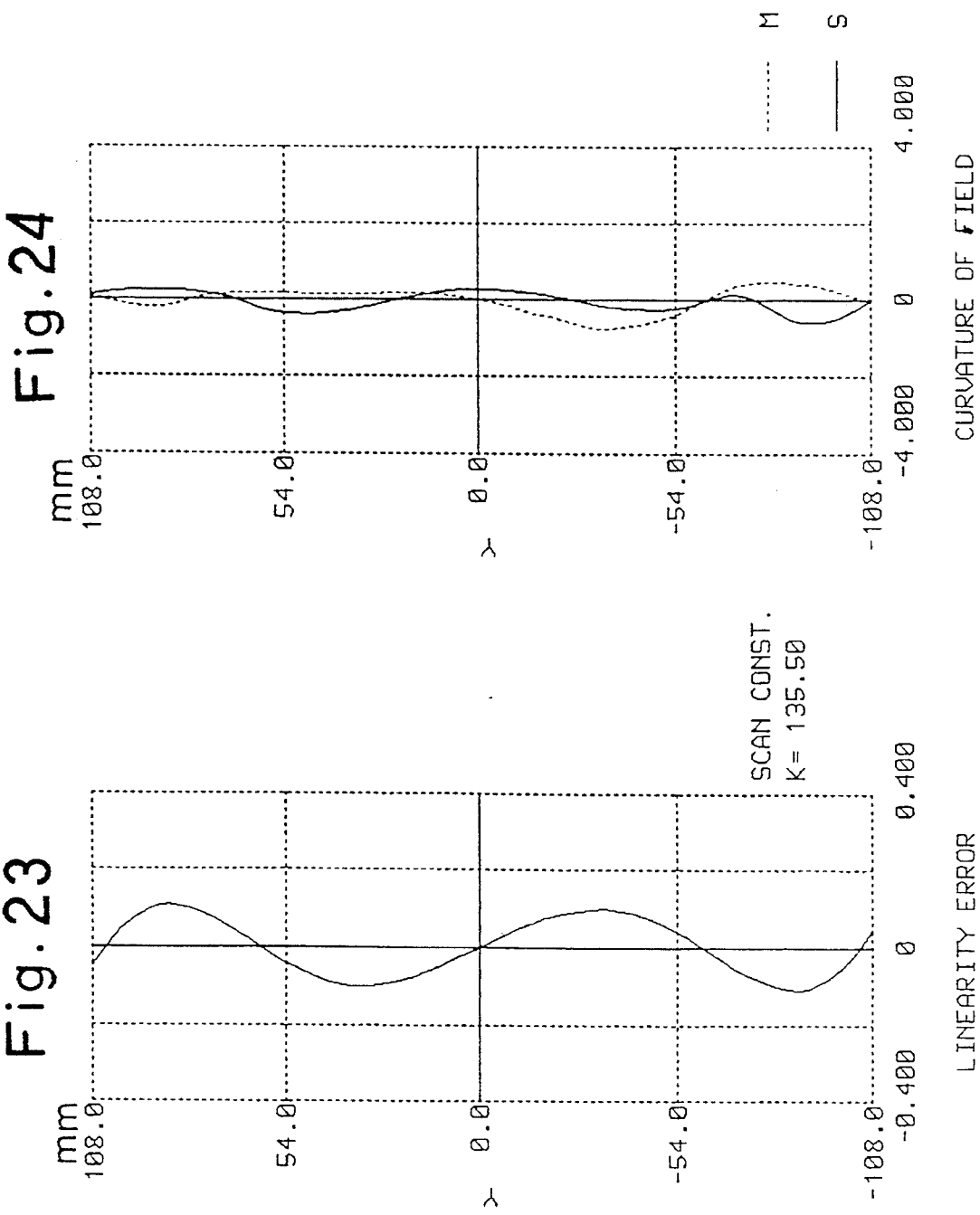

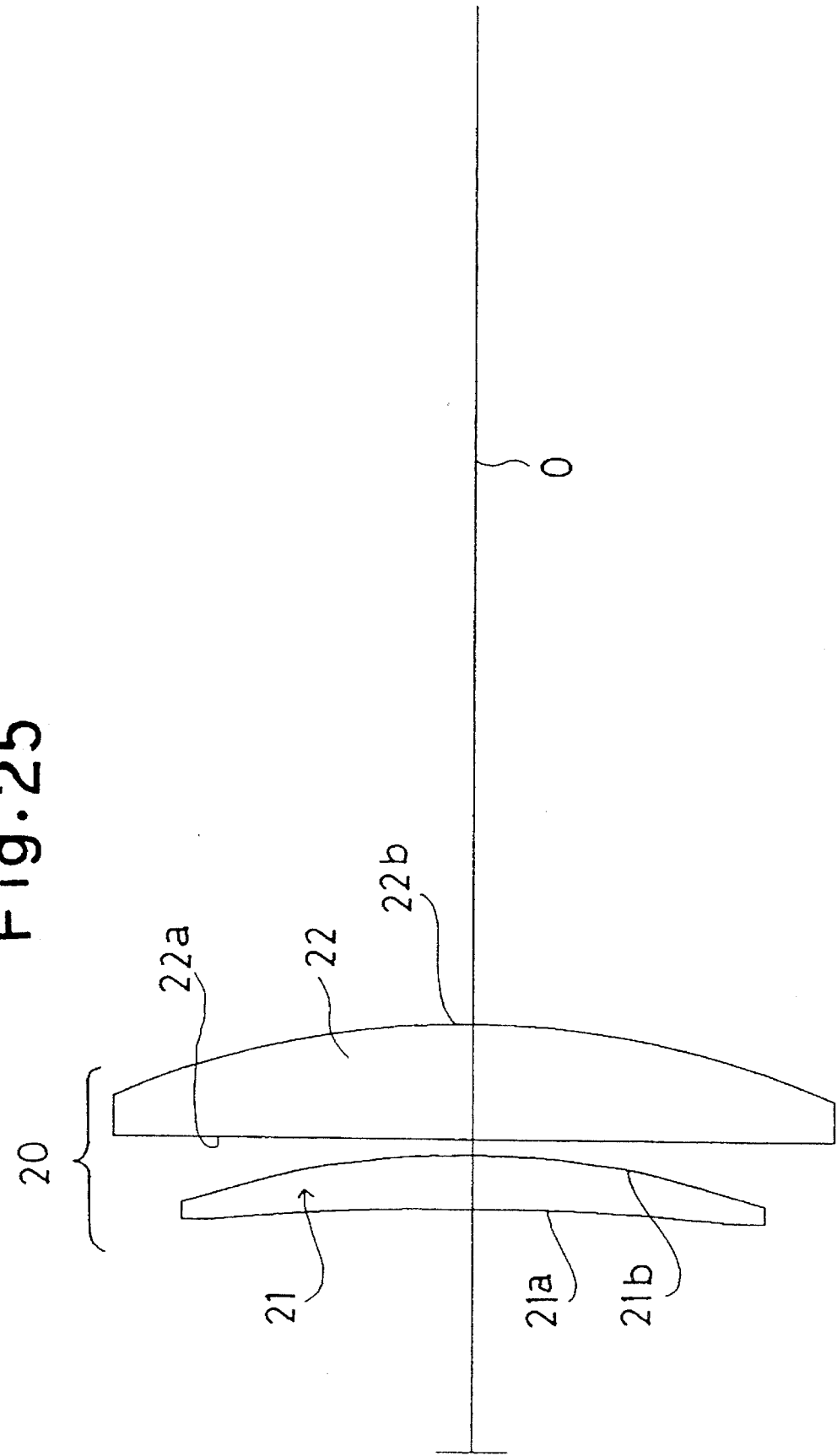

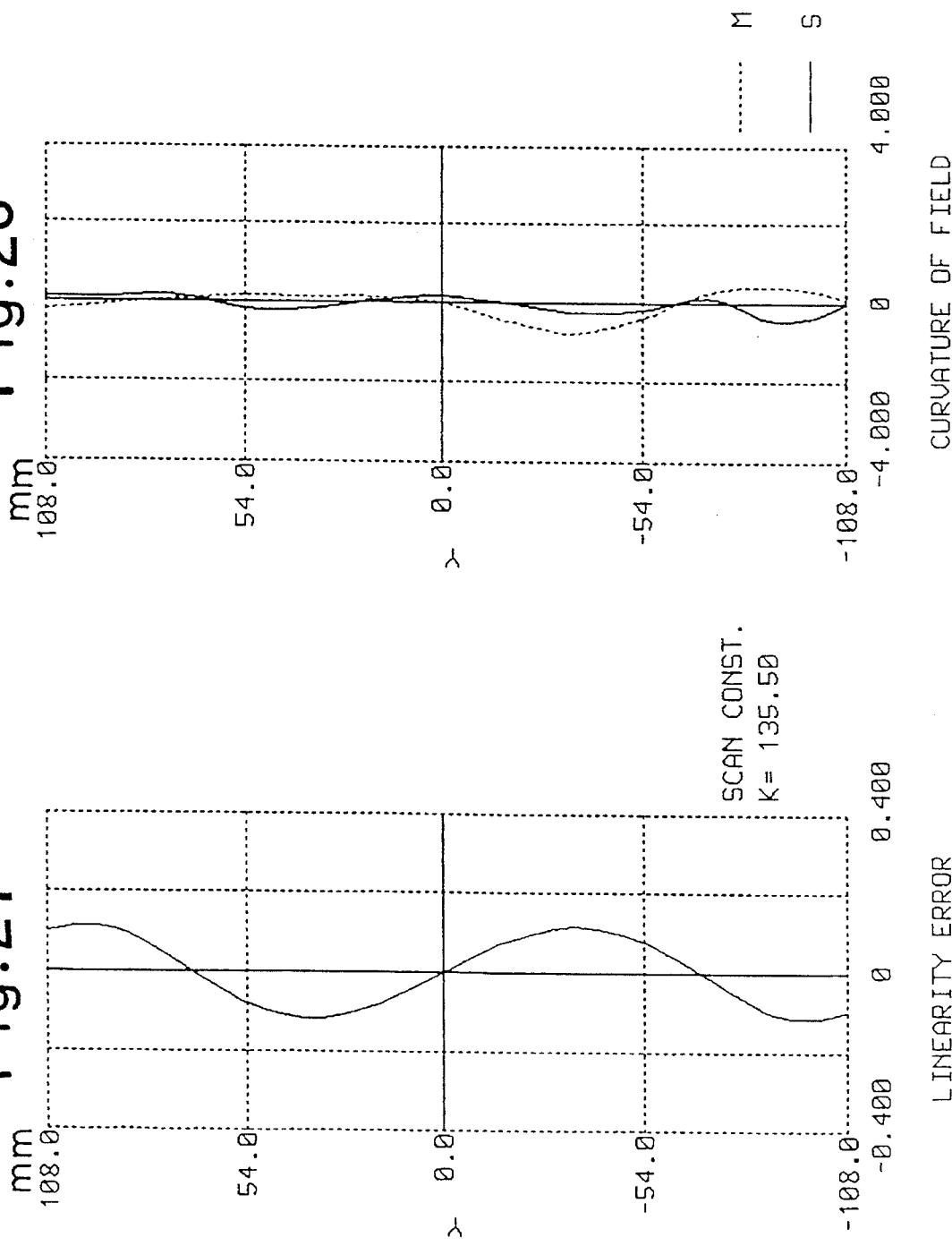

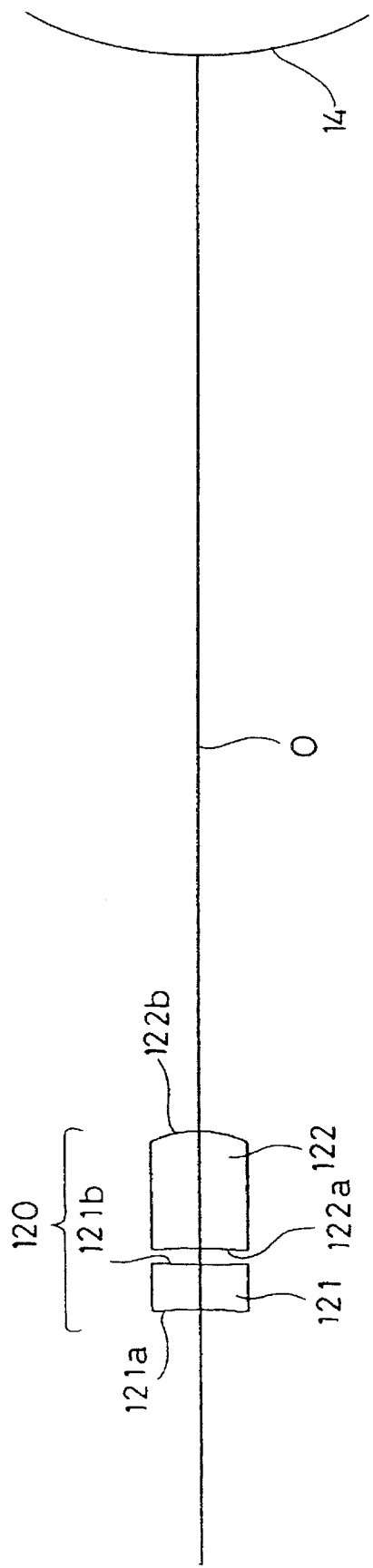

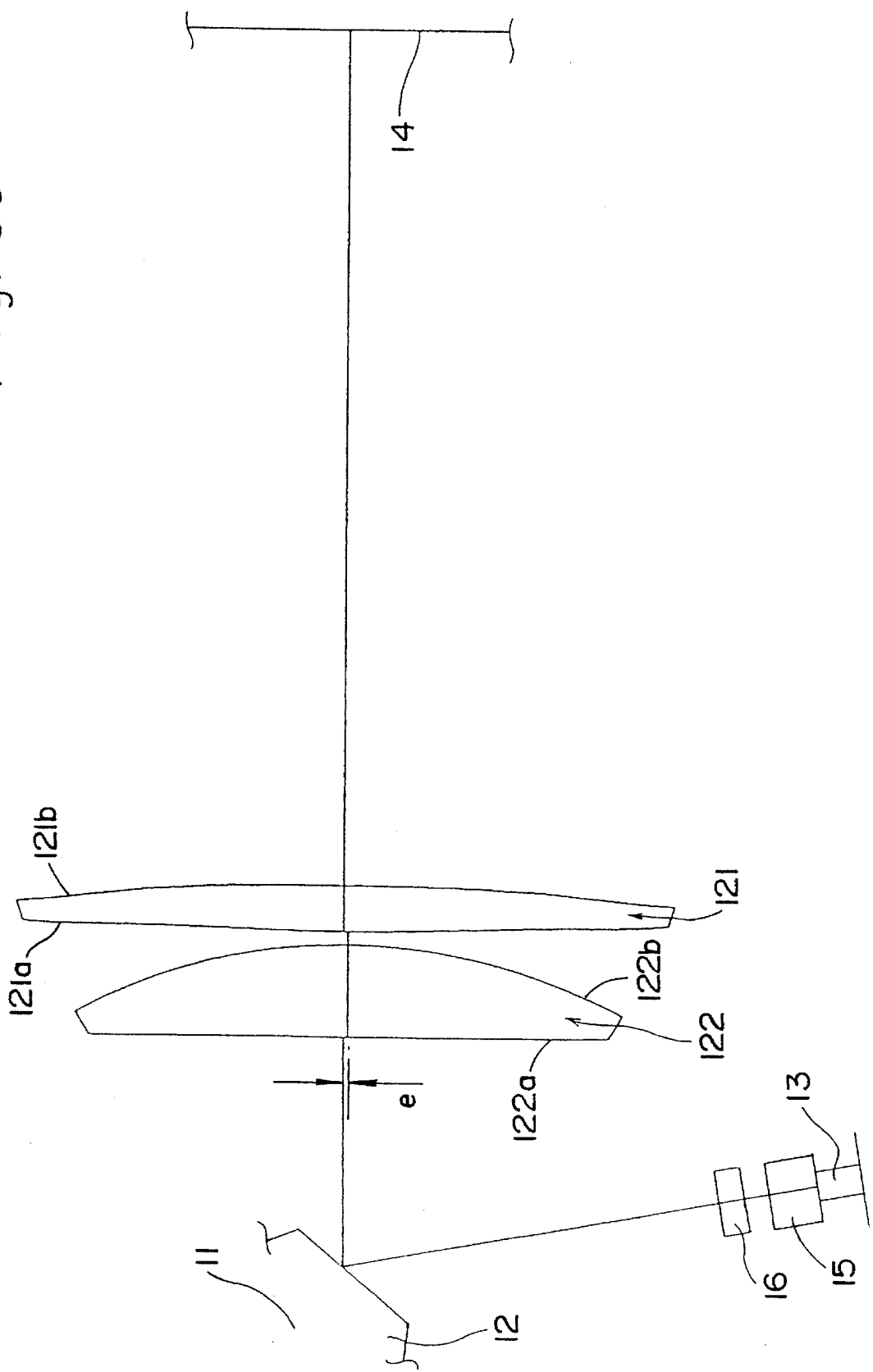

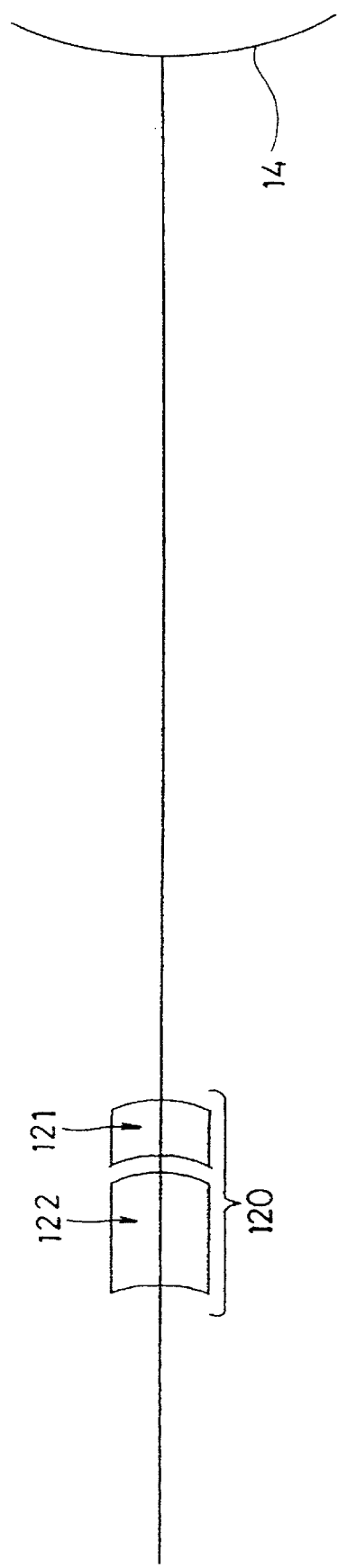

SCANNING OPTICAL SYSTEM

BACKGROUND OF THE INVENTION

1. Field of the Invention

The present invention relates to a scanning optical system, more particularly, to a scanning optical system with a high resolution which includes a plastic lens.

2. Description of the Related Art

A scanning optical system is essential to a laser printer, a laser scanner, a bar code reader or the like. In a scanning optical system, a polygonal mirror, a hologram disk or the like is used as a light deflector. A laser beam emitted from a semiconductor laser is incident upon, and deflected by, the light deflector. Then the laser beam passes through a scanning lens system such as an fθ lens system, to scan a predetermined area on a scanning surface (i.e., the main scanning is executed). The scanning surface is, for example, a sensitive paper or plate. While the main scanning is being executed, the scanning surface is moved in the direction perpendicular to the direction of the main scanning (i.e., the sub-scanning is executed). Thus, the scanning surface is two-dimensionally scanned.

The high precision fθ lens system used in a scanning optical system has conventionally consisted of more than two lenses made of glass including an anamorphic lens, and therefore it is costly to produce such a system. Japanese Unexamined Patent Publication No. 4-110817 has proposed an fθ lens system consisting of two toric lenses so as to make the fθ lens system totally out of plastics. A plastic lens is usually subject to variations in temperature and humidity. Thus, a deviation of the focal point in the fθ lens system will occur in the case where the fθ lens system is totally made of plastics. Japanese Unexamined Patent Publication No. 4-277715 has proposed an fθ lens system made totally of plastics, but is subject to a variation in temperature. However, a back focal length of this fθ lens system is short, which would restrict the construction of the system.

SUMMARY OF THE INVENTION

The primary object of the present invention is to provide a scanning optical system in which a deviation of the focal point occurring due to the variation in temperature and/or humidity is small, whose back focal length is long, and which has a good performance together with a low cost of production.

Another object of the present invention is to provide a scanning optical system which consists of a small number of lenses having simple shapes to therefore facilitate manufacturing and production.

In the present invention, realizing a high performance scanning optical system while lowering the cost of production of the same is achieved by using a combination of a glass lens and a plastic lens.

According to one aspect of the present invention, there is provided a scanning optical system in which a beam of light deflected by a light deflector scans a scanning surface along a main scanning direction through a scanning lens system. The scanning lens system includes an anamorphic lens made of glass which has a positive power in both the main scanning direction and a sub-scanning direction perpendicular to the main scanning direction. The positive power in the sub-scanning direction is larger than the positive power in the main scanning direction. The scanning system lens also includes a plastic lens.

Preferably, the plastic lens is formed to have an aspherical surface in the main scanning direction.

In an fθ lens system, it is a well-known practice to combine a glass lens and a plastic lens, and give a positive power to the glass lens. In addition, to this conventional arrangement, according to the present invention, the glass lens is formed as an anamorphic lens having a positive power in the sub-scanning direction which is larger than that in the main scanning direction, while the plastic lens is formed to have an aspherical surface along the main scanning direction so as to correct the curvature of field in the main scanning direction and the fθ characteristic.

Preferably, the plastic lens has a positive power in the main scanning direction.

In the case where the power of the plastic lens in the main scanning direction is made to be a positive power within the range where the influence due to the variation in temperature is small, the power of the glass lens is reduced, thereby the curvature of field in the main canning direction and fθ characteristic can be easily corrected.

It is practical that the glass lens is formed as a toric lens. Preferably, the glass lens has a toric surface. The shape of the toric surface is defined by an arc of a circle in the sub-scanning direction which is rotated about an axis which lies in a plane of the circle where the axis points in the sub-scanning direction, and the toric surface is convex in the main and sub-scanning directions towards the scanning surface. This arrangement is effective for correcting the curvature of field in the main scanning direction and the fθ characteristic, and for preventing the loss of transmittance of light through the circumferential portion of the glass lens.

Preferably, the scanning optical system satisfies the following formula:

$$-0.4 < f_o/f_p < 0.4 \tag{1}$$

where "$f_o$" represents the focal length of the glass lens along the sub-scanning direction in the vicinity of the optical axis of the glass lens, and where "$f_p$" represents the focal length of the plastic lens along the sub-scanning direction in the vicinity of the optical axis of the plastic lens.

To satisfy the above formula, the power of the glass lens is larger than that of the plastic lens and the power of the plastic lens in the sub-scanning direction may be a negative power. With this arrangement, a deviation of the focal point due to a variation in temperature and/or humidity can be controlled within a a small range by making the power of the plastic lens weak.

Preferably, at least one surface of the plastic lens is an aspherical surface which is not rotationally symmetrical about an optical axis. The aspherical surface is formed in a manner such that a radius of curvature of the aspherical surface along the sub-scanning direction away from the optical axis is independent of the shape of the aspherical surface along the main scanning direction. This arrangement is effective for correcting the curvature of field in the sub-scanning direction which occurs due to the arrangement in which the glass lens is formed having a positive power in the sub-scanning direction. In this arrangement, the other surface of the plastic lens may have an aspherical surface along the main scanning direction, this aspherical surface is rotationally symmetrical about the optical axis.

According to another aspect of the present invention, there is provided a scanning optical system in which a beam of light deflected by a light deflector scans a scanning surface along a main scanning direction through a scanning lens system. The scanning lens system includes a toric lens, which is made of glass, and includes a first surface facing the lght deflector and a second surface facing the scanning surface. The first surface is formed as a negative cylindrical surface and the second surface is formed as a positive toric surface having a rotational axis parallel to a sub-scanning direction perpendicular to the main scanning direction. The scanning lens system also includes a toric lens which is made of plastic, both surfaces of the plastic toric lens having a rotational axis parallel to the main scanning direction.

Preferably, the plastic toric lens has an aspherical surface along the main scanning direction so as to effectively correct the curvature of field in the main scanning direction and the fθ characteristic.

Preferably, the scanning optical system satisfies the following conditional formula $$0.6 < D4/f \quad (2)$$

where "f" represents a focal length of the scanning lens system, and "D4" represents a distance between the scanning surface and surface adjacent to the scanning surface which is either the glass toric lens or the plastic toric lens. More preferably, the scanning optical system satisfies the following formula:

$$0.8 < D4/f \quad (3)$$

A sufficiently large enough back focal length can be obtained if the above conditional formulas are satisfied.

Preferably, the scanning optical system satisfies the following conditional formula:

$$-2 < f/f_p < 2 \quad (4)$$

where "$f_p$" represents a focal length of the plastic toric lens along the sub-scanning direction.

This conditional formula shows that the power in the sub-scanning direction of the plastic toric lens must be made small in order to keep the deviation of the focal point due to a variation in temperature and/or humidity small. In the case where this conditional formula is not satisfied, the power of the plastic toric lens become too large, thus causing a deviation of the focal point due to a variation in temperature and/or humidity to become excessive.

The glass toric lens and the plastic toric lens may be aligned along an optical axis in this order, or in the reverse order, from the side of the light deflector.

The present disclosure relates to subject matter contained in Japanese Patent Application No. 5-325354 (filed on Dec. 22, 1993) and Japanese Patent Application No. 6-65255 (filed on Apr. 1, 1994) which are expressly incorporated herein by reference in their entireties.

BRIEF DESCRIPTION OF THE DRAWINGS

The present invention will be more apparent from the ensuing description with reference to the accompanying drawings, wherein:

FIG. 1 is a plan view of a scanning optical system according to the first embodiment of the present invention;

FIG. 2 is a front view of the scanning optical system shown in FIG. 1;

FIG. 5 is a plan view of a scanning optical system according to the second embodiment of the present invention:

FIG. 6 is a front view of the scanning optical system shown in FIG. 5;

FIG. 9 is a plan view of a scanning optical system according to the third embodiment of the present invention;

FIG. 10 is a front view of the scanning optical system shown in FIG. 9:

FIG. 11 is a graph showing the fθ characteristic in the scanning optical system illustrated in FIGS. 9 and 10;

FIG. 12 is a graph showing the curvature of field in the scanning optical system illustrated in FIGS. 9 and 10;

FIG. 14 is a front view of the scanning optical system shown in FIG. 13;

FIG. 17 is a plan view of a scanning optical system according to the fifth embodiment of the present invention;

FIG. 21 is a plan view of a scanning optical system according to the sixth embodiment of the present invention;

FIG. 22 is a front view of the scanning optical system shown in FIG. 21;

FIG. 23 is a graph showing the fθ characteristic in the scanning optical system illustrated in FIGS. 21 and 22;

FIG. 24 is a graph showing the curvature of field in the scanning optical system illustrated in FIGS. 21 and 22;

FIG. 25 is a plan view of a scanning optical system according to the seventh embodiment of the present invention;

FIG. 27 is a graph showing the fθ characteristic in the scanning optical system illustrated in FIGS. 25 and 26;

FIG. 28 is a graph showing the curvature of field in the scanning optical system illustrated in FIGS. 25 and 26;

FIG. 32 is a front view of the scanning optical system shown in FIG. 31;

FIG. 35 is a plan view of a scanning optical system according to the ninth embodiment of the present invention;

FIG. 36 is a front view of the scanning optical system shown in FIG. 35;

DETAILED DESCRIPTION OF THE PREFERRED EMBODIMENTS

Figure 4:
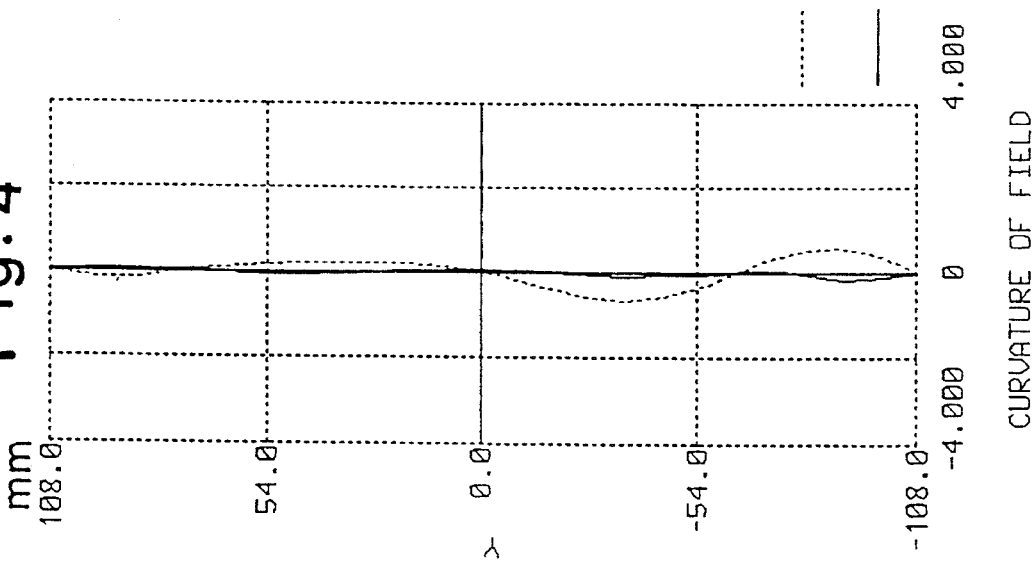
FIG. 4 is a graph showing the curvature of field in the scanning optical system illustrated in FIGS. 1 and 2.

Generally, in a scanning optical system, a semiconductor laser emits a beam of light which scans a scanning surface along a predetermined scanning direction. The scanning surface is moved, relative to the position where the beam of light scans, in the direction perpendicular to the predetermined scanning direction when scanned. Thus, the scanning surface is two-dimensionally scanned. In the following description, the predetermined scanning direction is referred to as a main scanning direction, and the direction of the relative movement of the scanning surface is referred to as a sub-scanning direction.

First Embodiment

FIGS. 1 and 2 show the configuration of the scanning optical system according to the first embodiment of the present invention. In FIG. 1, a polygonal mirror 12 used as a light deflector is shown which is rotatable about a rotation axis 11. As is well known, a laser beam emitted from a semiconductor laser 13 passes through a collimator lens 15 and a cylindrical lens 16, and is incident upon the polygonal mirror 12. The light beam is deflected by each reflection surface 12R. The reflected light beam passes through a scanning lens system 20 to scan a scanning surface 14. In case of a laser printer, the scanning surface 14 is a photosensitive drum.

One feature of the present invention is that the scanning lens system 20 of the scanning optical system, as described above, consists of a plastic lens 21 and a glass lens 22. The glass lens 22 is formed as a toric lens. The third surface 22a of the glass lens 22 is formed as a flat surface, and the fourth surface 22b of the glass lens 22 is formed to have a positive power in the main scanning direction (i.e., the direction perpendicular to an optical axis O and in the plane of the paper of FIG. 1) and a positive power in the sub-scanning direction (i.e., the direction perpendicular to the optical axis O and perpendicular to the plane of the paper of FIG. 1), the former positive power being different from the latter. The center of curvature of the fourth surface 22b along the main scanning direction and the center of curvature of the fourth surface 22b along the sub-scanning direction are accordingly located at different points on the optical axis O on the side toward the polygonal mirror 12 from the fourth surface 22b, and the fourth surface 22b is convex in the main and sub-scanning directions towards the scanned surface 14.

The first surface 21a of the plastic lens 21 is formed as an aspherical surface which is rotationally symmetrical about the optical axis of the plastic lens 21. The second surface 21b of the plastic lens 21 is formed as an aspherical surface which is not rotationally symmetrical about the optical axis of the plastic lens 21. The aspherical surfaces of the first and second surfaces 21a and 21b will be explained in detail with reference to FIGS. 29 and 30.

Figure 29:
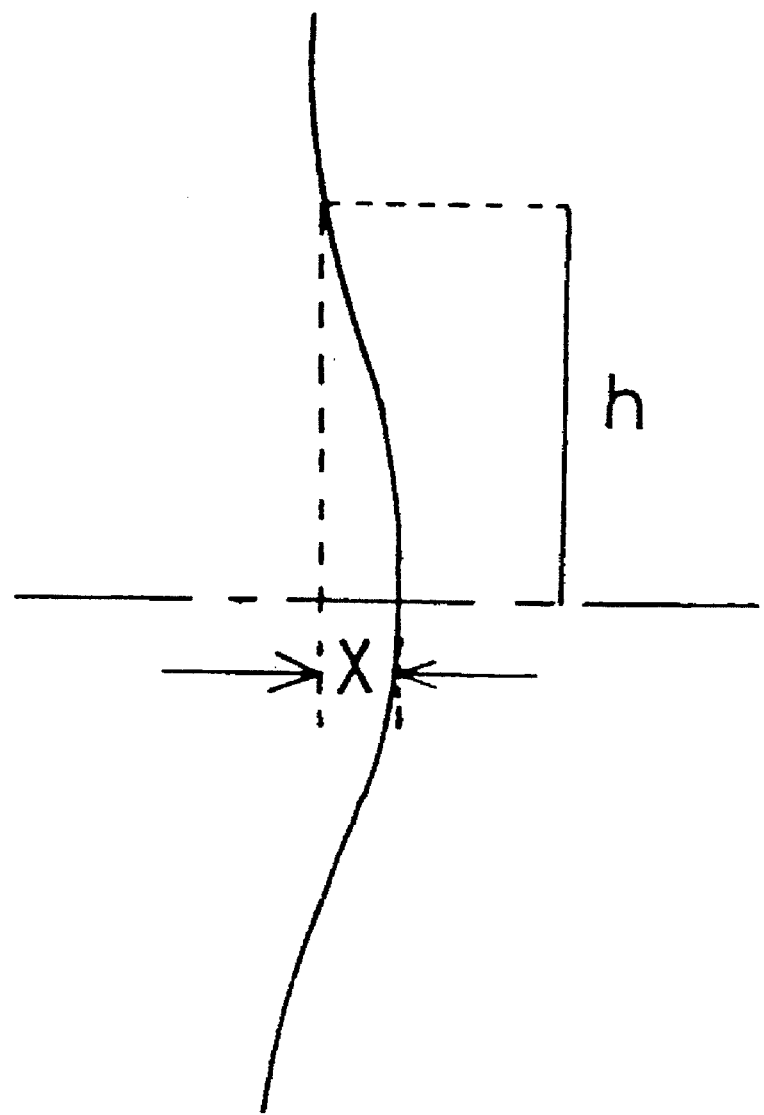
FIG. 29 is a conceptional figure of an aspherical surface which is rotationally symmetrical and used in the scanning optical system to which the present invention is applied.

A rotationally symmetrical aspherical surface is defined by FIG. 29 and the following equation:

$$x = Cy^2/\{1+[1-(1+K)C^2y^2]^{1/2}\} + A_4y^4 + A_6y^6 + A_8y^8 + A_{10}y^{10} + \quad (5)$$

where "y" represents a height from the optical axis,
"x" represents a distance from a tangent plane of an aspherical vertex,
"C" represents a curvature of the aspherical vertex (1/r),
"K" represents a conic constant,
"$A_4$" represents a fourth-order aspherical factor,
"$A_6$" represents a sixth-order aspherical factor,
"$A_8$" represents an eighth-order aspherical factor,
"$A_{10}$" represents a tenth-order aspherical factor.

The curvature of field in the main scanning direction and the fθ characteristic due to the glass lens 22 can be corrected by forming either surface of the plastic lens 21, e.g., the first surface 21a, as an aspherical surface along the main scanning direction rotationally symmetrical about the optical are of the plastic lens 21. The degree of asphericity of the aspherical surface is defined depending upon the types of lens systems.

Figure 30:
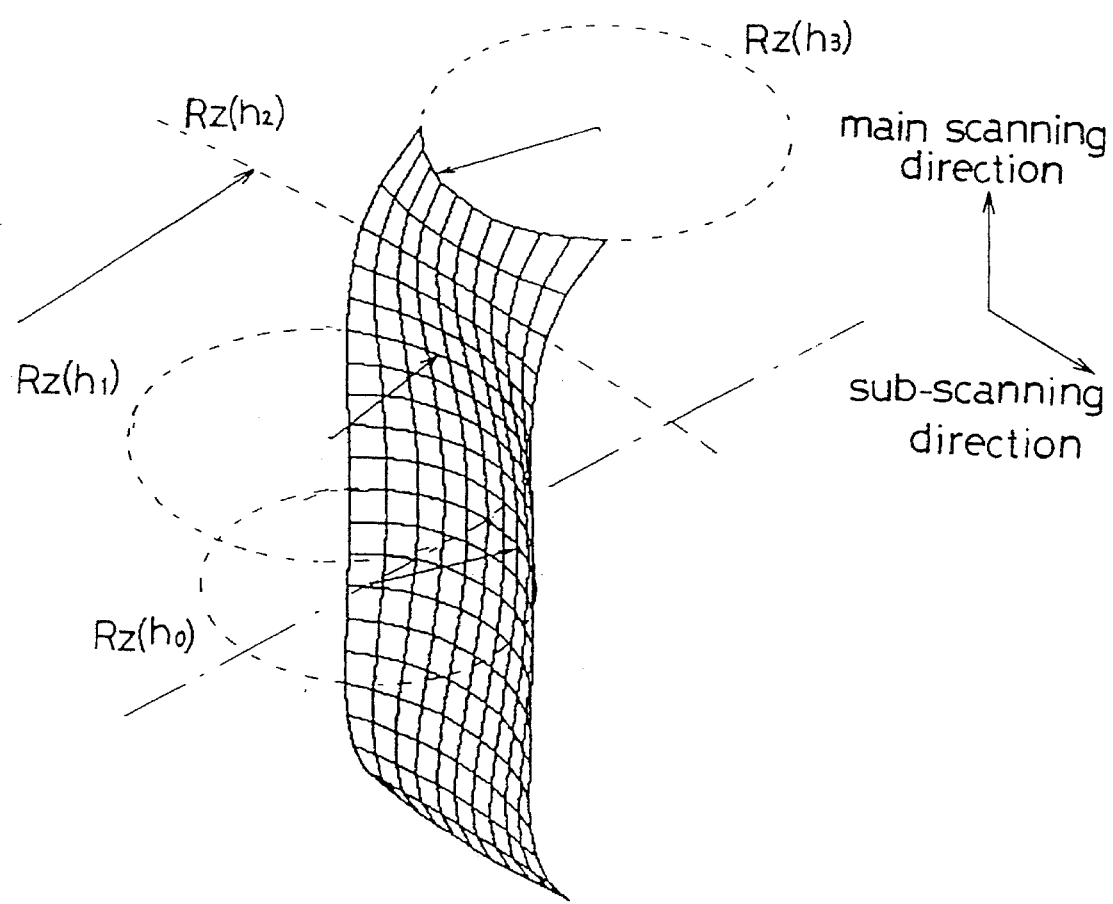
FIG. 30 is a conceptional figure of an aspherical surface which is not rotationally symmetrical and used in the scanning optical system to which the present invention is applied.

FIG. 30 shows a conceptional figure of an aspherical surface which is not rotationally symmetrical about the optical axis O end whose radius of curvature along the sub-scanning direction apart from the optical axis O is set independently of the shape of the aspherical surface along the main scanning direction. This aspherical surface is defined by the following equations:

$$x = Cy^2/\{1+[1-(1+K)C^2y^2]^{1/2}\} + A_4y^4 + A_6y^6 + A_8y^8 + A_{10}y^{10} + \quad (6a)$$

$$1/R_z = (1/R_{z\,0}) + B_1y + B_2y^2 + B_3y^8 + B_4y^4 + \quad (6b)$$

where "$R_z$" represents the radius of curvature of each lens surface along the sub-scanning direction, "$R_{z\,0}$" represents the radius of curvature of a reference spherical surface for each lens surface along the sub-scanning direction, and B1, B2, B3 and B4 represent the first-order, second-order, third-order and fourth-order aspherical factors along the sub-scanning direction, respectively.

The combination of a cross section along the main-scanning direction defined by the equation (a) and circular arcs defined by the equation (b) define a shape of the aspherical surface which is not rotationally symmetrical about the optical axis of the lens.

In this embodiment, the curvature of field in the sub-scanning direction can be easily corrected by making the variation of "$R_z$" asymmetrical with respect to the optical axis of the lens by means of "B1" and "B3".

The curvature of field in the sub-scanning direction due to the glass lens 22 can be effectively corrected by forming either surface of the plastic lens 21, e.g., forming the second surface 21b, as an aspherical surface as shown in FIG. 30 which is not rotationally symmetrical about the optical axis of the plastic lens 21. The degree of asphericity of the aspherical surface is defined depending upon the types of lens systems.

Figure 3:
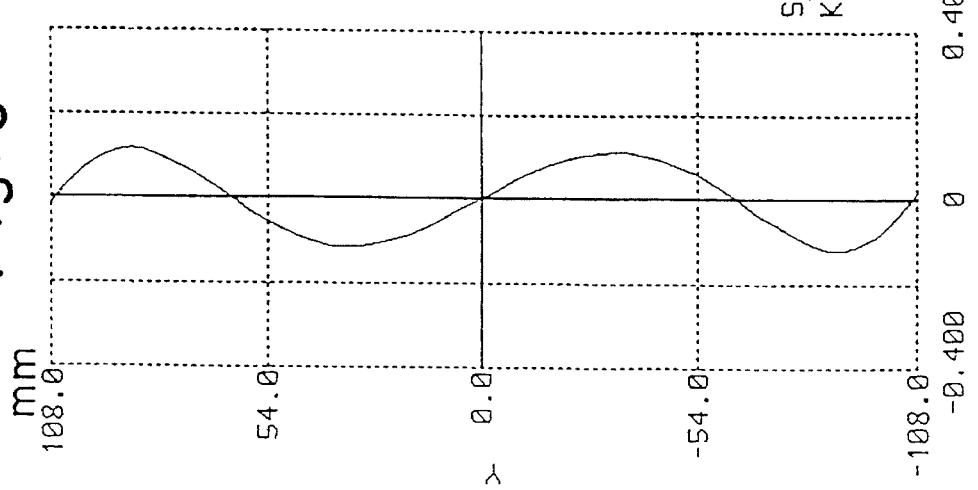
FIG. 3 is a graph showing the fθ characteristic in the scanning optical system illustrated in FIGS. 1 and 2.

FIG. 3 is a graph showing the results of measuring the fθ characteristic in the scanning optical system 20 having the specific numerical values shown in Table 1. FIG. 4 shows a graph showing the result of measuring the curvature of field in the scanning optical system 20 in the meridional section M (i.e., main-scanning direction) and in the sagittal section S (i.e., sub-scanning direction). In FIGS. 3 and 4, the vertical line shows the position in the main-scanning direction. In FIG. 3, the horizontal line shows the displacement of the image height with respect to the ideal image height (mm). In FIG. 4, the horizontal line shows the displacement of the image plane with respect to the ideal image plane (mm).

In the Tables below, "f" represents focal length, "$f_S$" represents back focal length, "R" represents a radius of curvature of each lens surface along the main scanning plane, "$R_2$" represents a radius of curvature of each lens surface along the sub-scanning plane, "D" represents a thickness of a lens or distance between lens surfaces, and "N" represents the refractive index at a wavelength of 780 nm. The units of measurement are in mm.

TABLE 1 f = 134.78
$f_B$ = 130.71
scanning coefficient = 135.5

| Surface No. | R | Rz | D | N |
|---|---|---|---|---|
| polygonal mirror 12 | | | 31.301 | |
| 1* | 5018.638 | 5018.638 | 6.000 | 1.48617 |
| 2** | −202.487 | 5000.000 | 2.000 | |
| 3 | ∞ | ∞ | 15.00 | 1.51072 |
| 4 | −100.617 | −20.714 | 130.710 | |

*indicates an aspherical surface which is rotationally symmetrical about the optical axis.
**indicates an aspherical surface which is not rotationally symmetrical about the optical axis.

The first surface 21a has the coefficients:

$AK=3.1442, A4=-1.12656\times10^{-6}, A6=1.12898\times10^{-10},$ $A8=2.70449\times10^{-12}, A10=0$ as defined with regard to equation (5).
The second surface, 22b has the coefficients:

$BK=0, B4=-5.51361\times10^{-9}, B6=-1.17056\times10^{-10},$ $B8=8.47695\times10^{-14}, B10=1.00177\times10^{-16}$ $C1=3.34515\times10^{-5}, C2=9.90710\times10^{-6}, C3=1.18558\times10^{-8},$ $C4=-6.42071\times10^{-9}, C5=-9.56055\times10^{-12}, C6=3.56430\times10^{-12}$ as defined with regard to equations (6a) and (6b).

Second Embodiment

Figure 8:
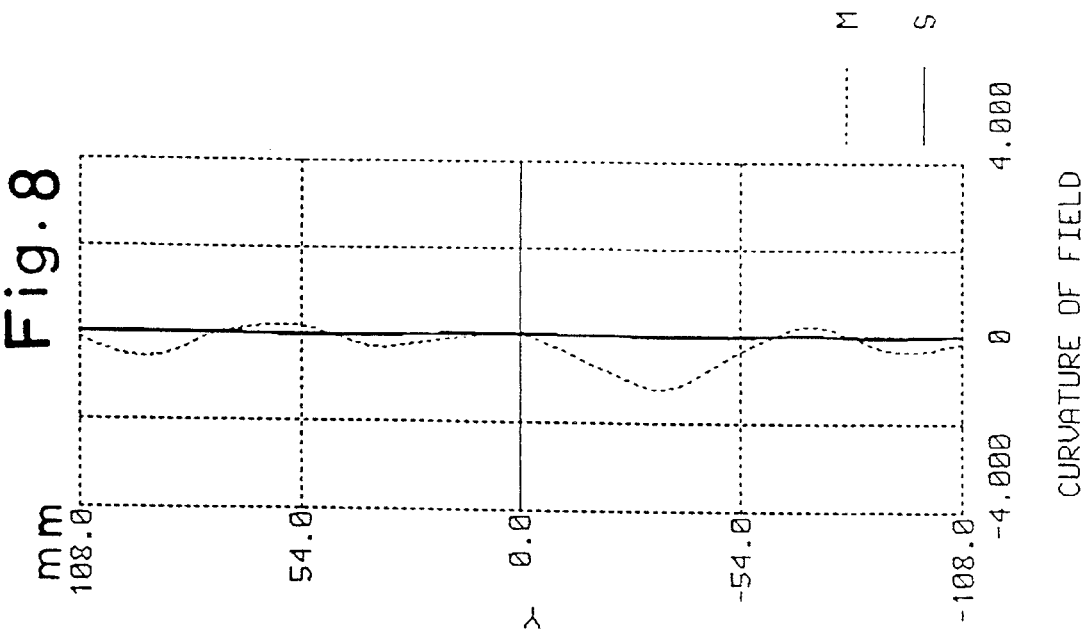
FIG. 8 is a graph showing the curvature of field in the scanning optical system illustrated in FIGS. 5 and 6.
Figure 7:
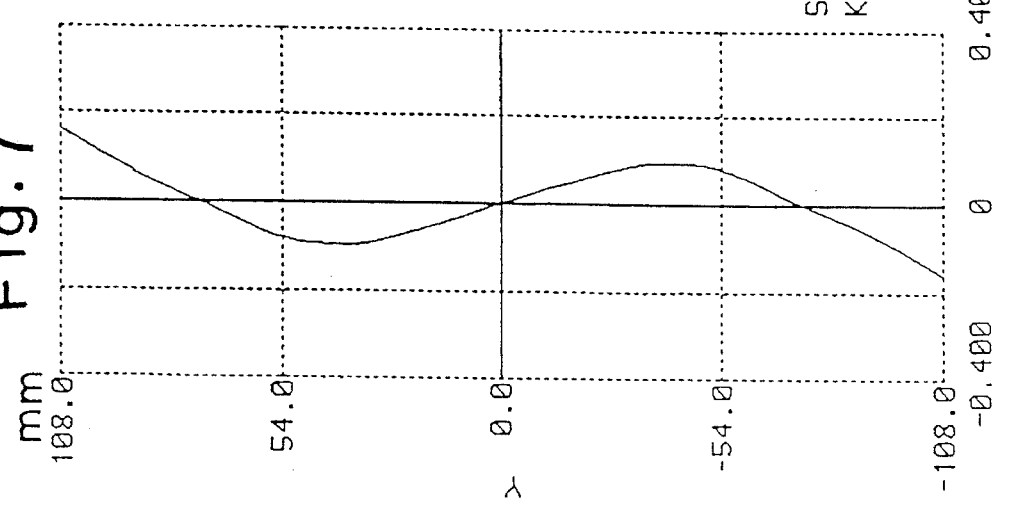
FIG. 7 is a graph showing the fθ characteristic in the scanning optical system illustrated in FIGS. 5 and 6.

FIGS. 5 and 6 show the second embodiment of the present invention. In this embodiment, the arrangement of lenses is the same as that of the first embodiment. The disposition of the aspherical surface of the plastic lens is also the same as the first embodiment. The numerical values of the second embodiment are shown in Table 2, the fθ characteristic in FIG. 7, and the curvature of field in FIG. 8. For the second embodiment and the other following embodiments, only the scanning lens system 20 is shown in the respective FIG.

TABLE 2 f = 135.08
$f_B$ = 130.44
scanning coefficient = 135.5

| Surface No. | R | Rz | D | N |
|---|---|---|---|---|
| polygonal mirror 12 | | | 32.436 | |
| 1* | −1263.022 | −1263.022 | 10.000 | 1.48617 |
| 2** | −101.385 | −1200.000 | 2.137 | |
| 3 | ∞ | ∞ | 10.00 | 1.60910 |
| 4 | −197.343 | −24.857 | 130.436 | |

*indicates an aspherical surface which is rotationally symmetrical about the optical axis.
**indicates an aspherical surface which is not rotationally symmetrical about the optical axis.

The first surface 21a has the coefficients:

$AK=3.0469, A4=-1.39123\times10^{-6}, A6=3.87686\times10^{-10},$ $A8=1.92837\times10^{-18}, A10=0$ as defined with regard to equation (5).
The second surface 21b has the coefficients:

$BK=0, B4=-8.99489\times10^{-9}, B6=2.42667\times10^{-10},$ $B8=-3.62672\times10^{-18}, B10=2.74318\times10^{-16}$ $C1=2.25812\times10^{-6}, C2=9.92655\times10^{-6}, C3=2.21000\times10^{-8},$ $C4=-1.90781\times10^{-5}, C5=-4.52795\times10^{-12}, C6=3.02651\times10^{-12}$ as defined with regard to equations (6a) and (6b).

Third Embodiment

FIGS. 9 and 10 show the third embodiment of the present invention. In this embodiment, the arrangement of lenses is the same as that of the first embodiment. The first surface 21a of the plastic lens 21 is formed as an aspherical surface which is not rotationally symmetrical about an optical axis O, and the second surface 21b of the plastic lens 21 is formed as an aspherical surface which is rotationally symmetrical about the optical axis O. The numerical values of the second embodiment are shown in Table 3, the fθ characteristic in FIG. 11, and the curvature of field in FIG. 12.

TABLE 3 f = 134.77
$f_B$ = 130.75
scanning coefficient = 135.5

| Surface No. | R | Rz | D | N |
|---|---|---|---|---|
| polygonal mirror 12 | | | 31.261 | |
| 1** | 4320.386 | −200.000 | 6.000 | 1.48617 |
| 2* | −206.851 | −206.851 | 2.000 | |
| 3 | ∞ | ∞ | 15.00 | 1.51072 |
| 4 | −99.932 | −20.902 | 130.751 | |

*indicates an aspherical surface which is rotationally symmetrical about the optical axis.
**indicates an aspherical surface which is not rotationally symmetrical about the optical axis.

The second surface 21b has the coefficients:

$AK=0, A4=-5.51361\times10^{-9}, A6=-1.17056\times10^{-10},$ $A8=8.47695\times10^{-14}, A10=1.00177\times10^{-18}$ as defined with regard to equation (5).
The first surface 21 has the coefficients:

$BK=3.14421, B4=-1.12877\times10^6, B6=1.07175\times10^{-10}$, $B8=2.75192\times10^{-18}, B10=0$ $C1=-4.41088\times10^{-8}, C2=-2.10499\times10^{-6}, C3=-5.99868\times10^{-9}$ $C4=1.28155\times10^{-6}, C5=1.35347\times10^{-11}, C6=-1.37293\times10^{-12}$ as defined with regard to equations (6a) and (6b).

Fourth Embodiment

Figure 13:
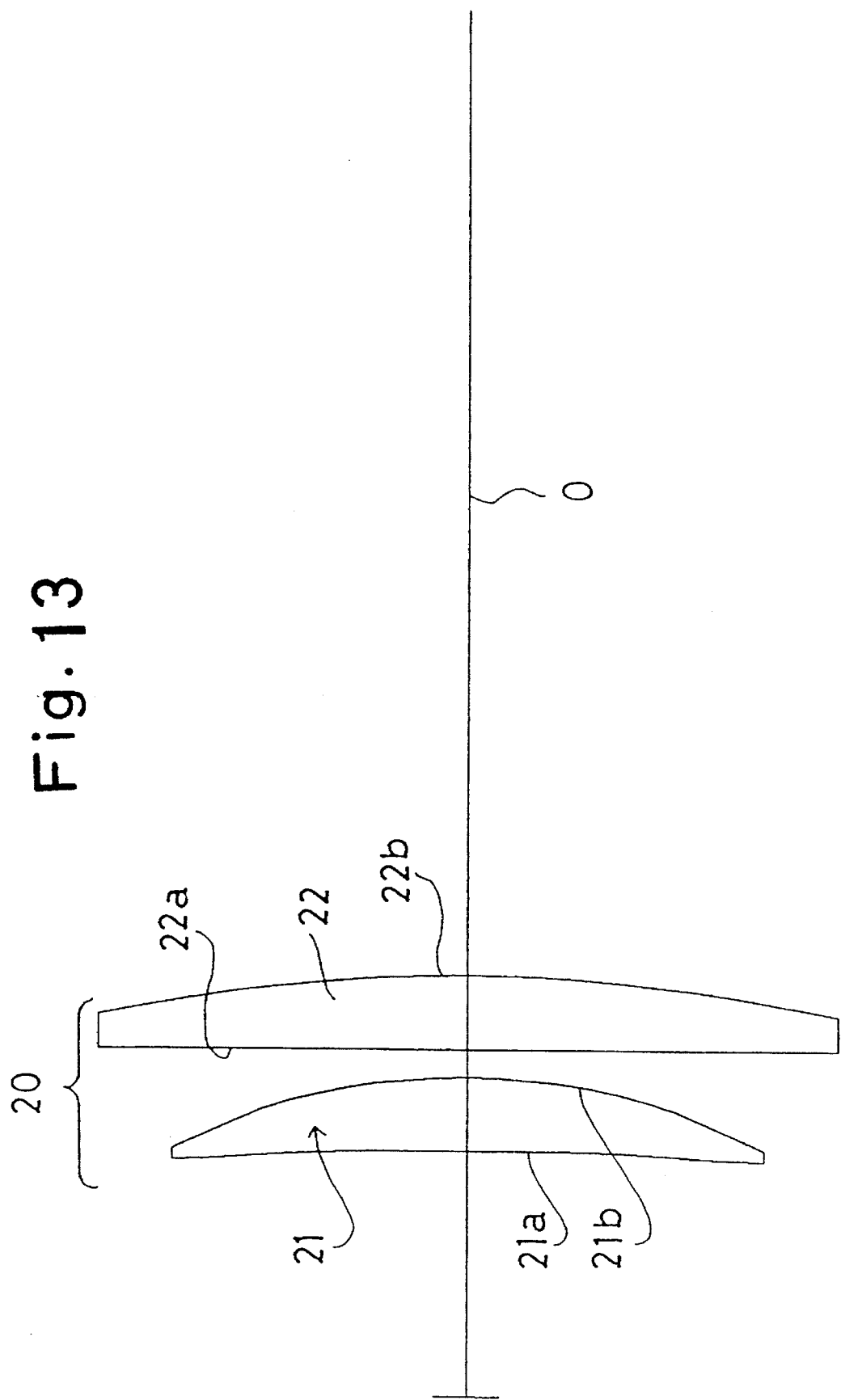
FIG. 13 is a plan view of a scanning optical system according to the fourth embodiment of the present invention.
Figure 16:
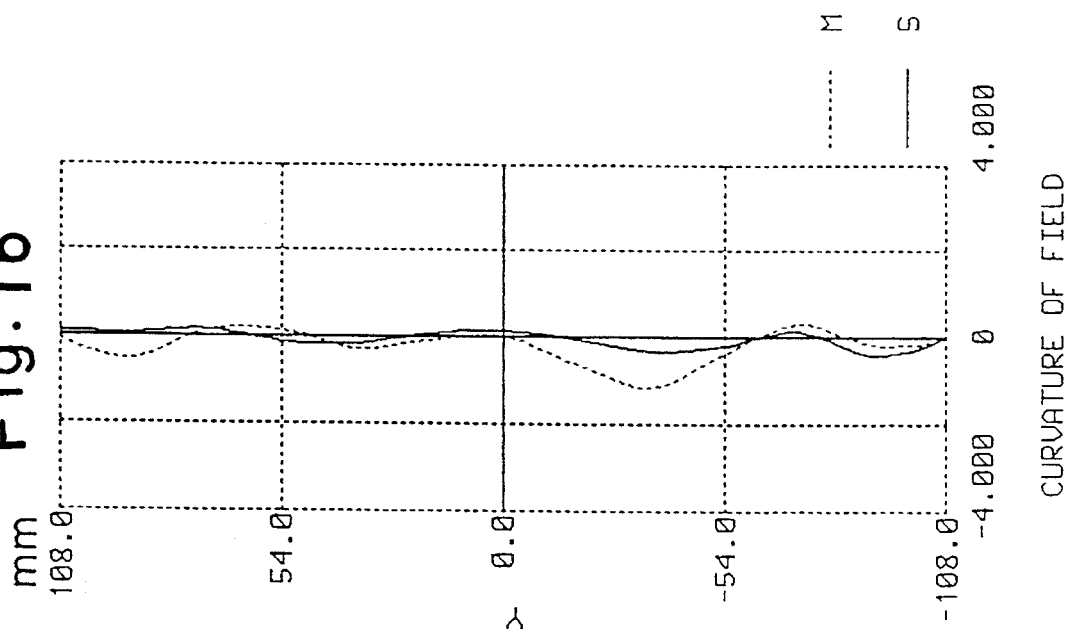
FIG. 16 is a graph showing the curvature of field in the scanning optical system illustrated in FIGS. 13 and 14.
Figure 15:
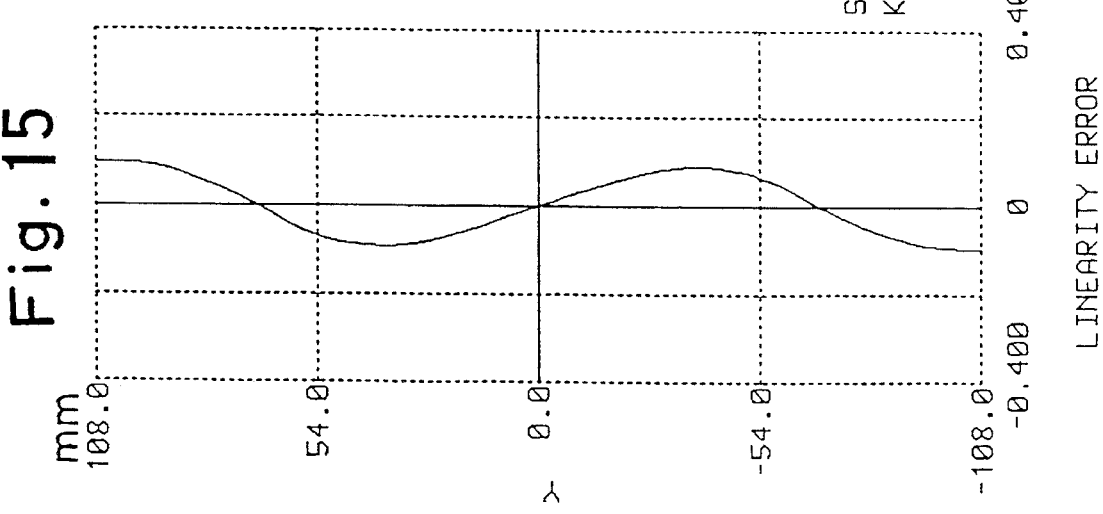
FIG. 15 is a graph showing the fθ characteristic in the scanning optical system illustrated in FIGS. 13 and 14.

FIGS. 13 and 14 show the fourth embodiment of the present invention. In this embodiment, the arrangement of lenses is the same as that of the third embodiment. The disposition of the aspherical surface of the plastic lens 21 is also the same as the third embodiment. The numerical values of the fourth embodiment are shown in Table 4, the fθ characteristic in FIG. 15, and the curvature of field in FIG. 16.

TABLE 4

| | | | | |
|---|---|---|---|---|
| f = 135.05 | | | | |
| $f_B$ = 128.49 | | | | |
| scanning coefficient = 135.5 | | | | |
| Surface No. | R | Rz | D | N |
| polygonal mirror 12 | | | 32.830 | |
| 1** | −11903.707 | −100.000 | 10.000 | 1.48617 |
| 2* | −97.738 | −97.738 | 3.693 | |
| 3 | ∞ | ∞ | 10.00 | 1.60910 |
| 4 | −234.623 | −26.300 | 128.485 | |

*indicates an aspherical surface which is rotationally symmetrical about the optical axis.
**indicates an aspherical surface which is not rotationally symmetrical about the optical axis.

The second surface 21b has the coefficients:

$AK=0.1702, A4=-6.93331\times10^{-9}, A6=1.63116\times10^{-10}$, $A8=-3.16340\times10^{-18}, A10=2.01969\times10^{-14}$ as defined with regard to equation (5).
The first surface 21a has the coefficients:

$BK=3.63710, B4=-1.14863\times10^{-6}, B6=2.66624\times10^{-10}$, $B8=1.09477\times10^{-13}, B10=0$ $C1=-3.53465\times10^{-8}, C2=-2.58996\times10^{-5}, C3=-1.96205\times10^{-8}$ $C4=1.52955\times10^{-8}, C5=1.49365\times10^{-11}, C6=-2.92880\times10^{-12}$ as defined with regard to equations (6a) and (6b).

Fifth Embodiment

Figure 18:
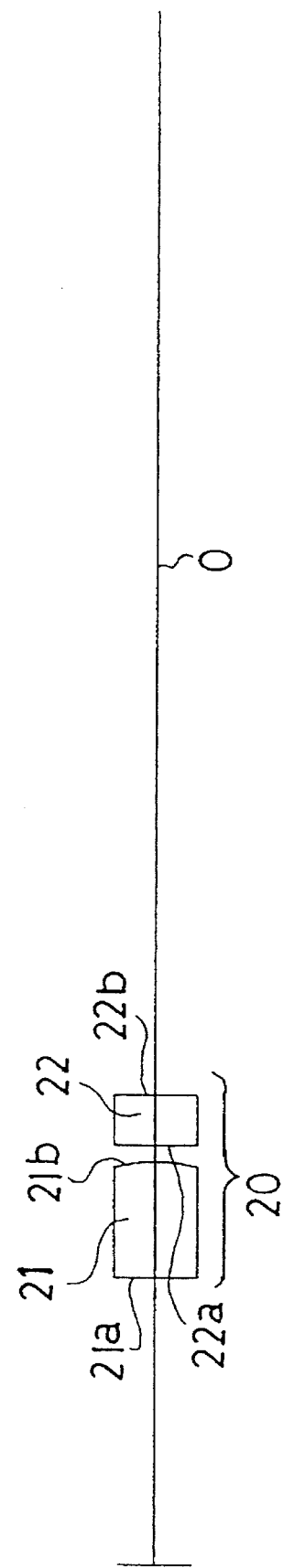
FIG. 18 is a front view of the scanning optical system shown in FIG. 17.
Figure 20:
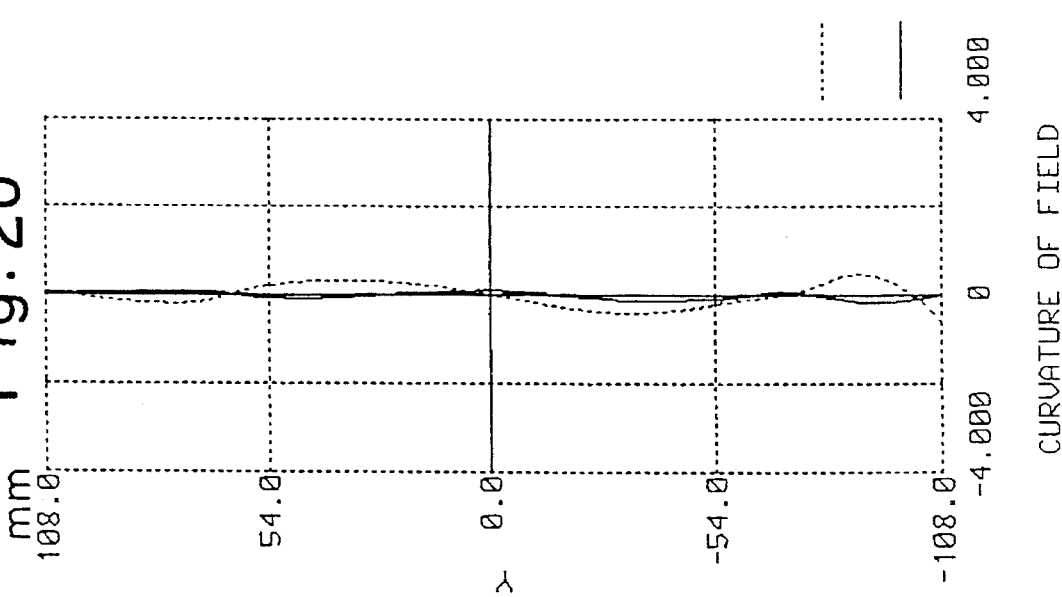
FIG. 20 is a graph showing the curvature of field in the scanning optical system illustrated in FIGS. 17 and 18.
Figure 19:
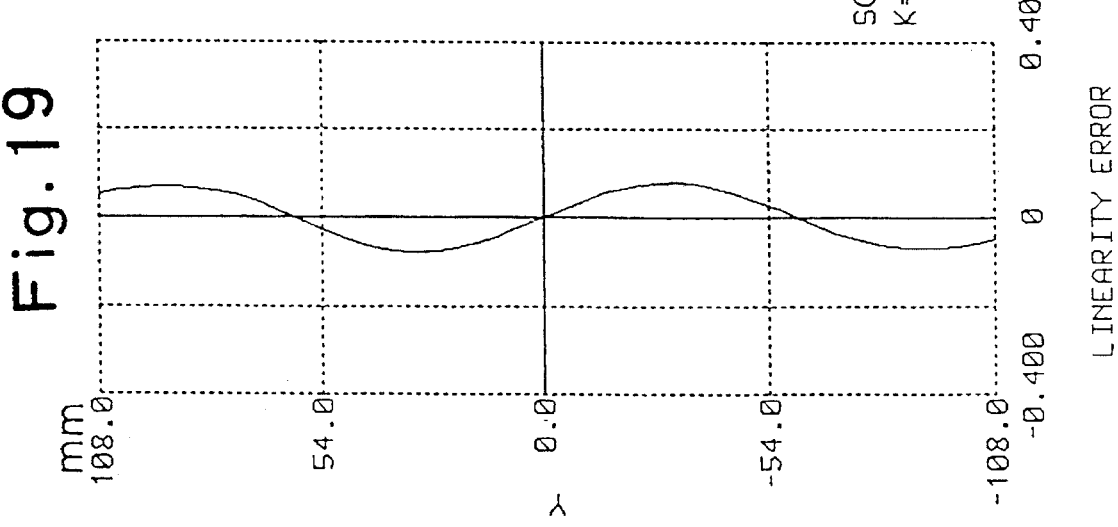
FIG. 19 is a graph showing the fθ characteristic in the scanning optical system illustrated in FIGS. 17 and 18.

FIGS. 17 and 18 show the fifth embodiment of the present invention. In this embodiment, the positions of the plastic lens 21 and the glass lens 22 are reversed as compared with those in the above noted other embodiments. That is, in order, from the side of the polygonal mirror 11 are placed the first surface 22a of the glass lens 22, the second surface 22b of the glass lens 22, the third surface 21a of the plastic lens 21, and the fourth surface 21b of the plastic lens 21 along the optical axis O. The first surface 22a of the glass lens 22 is formed as a flat surface. The second surface 22b of the glass lens is formed as a toric surface. The third surface 21a of the plastic lens 21 is formed as an aspherical surface which is not rotationally symmetrical about an optical axis O, and the fourth surface 21b of the plastic lens 21 is formed as an aspherical surface which is rotationally symmetrical about the optical axis O. The numerical values of the fifth embodiment are shown in Table 5, the fθ characteristic in FIG. 19, and the curvature of field in FIG. 20.

TABLE 5

| | | | | |
|---|---|---|---|---|
| f = 134.96 | | | | |
| $f_B$ = 128.89 | | | | |
| scanning coefficient = 135.5 | | | | |
| Surface No. | R | Rz | D | N |
| polygonal mirror 12 | | | 34.119 | |
| 1 | ∞ | ∞ | 14.000 | 1.51072 |
| 2 | −84.334 | −20.222 | 2.000 | |
| 3** | 230.000 | 450.000 | 6.000 | 1.48617 |
| 4* | 632.189 | 632.189 | 128.887 | |

*indicates an aspherical surface which is rotationally symmetrical about the optical axis.
**indicates an aspherical surface which is not rotationally symmetrical about the optical axis.

The fourth surface 22b has the coefficients:

$AK=-22.4924, A4=-1.07232\times10^{-8}, A6=-3.31382\times10^{-11}$, $A8=2.81544\times10^{-14}, A10=0$ as defined with regard to equation (5). The third surface 22a has the coefficients:

$BK=-6.82015, B4=-1.26611\times10^{-6}, B6=5.24720\times10^{-11}$, $B8=2.00000\times10^{-14}, B10=0$ $C1=-2.16562\times10^{-5}, C2=-9.64459\times10^{-6}, C3=-3.79942\times10^{-9}$ $C4=1.14942\times10^{-9}, C5=7.59229\times10^{-18}, C6=-9.04270\times10^{-14}$ as defined with regard to equations (6a) and (6b).

Sixth Embodiment

FIGS. 21 and 22 show the sixth embodiment of the present invention. In this embodiment, the arrangement of lenses is the same as that of the third embodiment. The disposition of the aspherical surface of the plastic lens 21 is also the same as the third embodiment. The numerical values of the sixth embodiment are shown in Table 6, the fθ characteristic in FIG. 23, and the curvature of field in FIG. 24.

TABLE 6

| | | | | |
|---|---|---|---|---|
| f = 134.85 | | | | |
| $f_B$ = 130.59 | | | | |
| scanning coefficient = 135.5 | | | | |
| Surface No. | R | Rz | D | N |
| polygonal mirror 12 | | | 31.413 | |
| 1** | 750.000 | 750.000 | 6.005 | 1.48617 |
| 2* | −272.193 | −272.193 | 2.000 | |
| 3 | ∞ | ∞ | 15.00 | 1.51072 |
| 4 | −99.199 | −18.672 | 130.593 | |

*indicates an aspherical surface which is rotationally symmetrical about the optical axis.

TABLE 6-continued

| | f = 134.85 | | | |
| | $f_B$ = 130.59 | | | |
| | scanning coefficient = 135.5 | | | |
| Surface No. | R | Rz | D | N |

**indicates an aspherical surface which is not rotationally symmetrical about the optical axis.

The second surface 21b has the coefficients:

$AK=-0.0471$, $A4=-5.17100\times10^{-9}$, $A6=-5.75786\times10^{-11}$, $A8=1.04661\times10^{-12}$, $A10=1.21385\times10^{-14}$ as defined with regard to equation (5).
The first surface 21b has the coefficients:

$BK=0$, $B4=-1.11864\times10^{-6}$, $B6=1.57000\times10^{-10}$, $B8=3.37958\times10^{-18}$, $B10=0$ $C1=-8.31063\times10^{-5}$, $C2=-3.24022\times10^{-5}$, $C3=2.12959\times10^{-8}$, $C4=2.25651\times10^{-8}$, $C5=7.76373\times10^{-12}$, $C6=-3.42967\times10^{-12}$ as defined with regard to equations (6a) and (6b).

Seventh Embodiment

Figure 26:
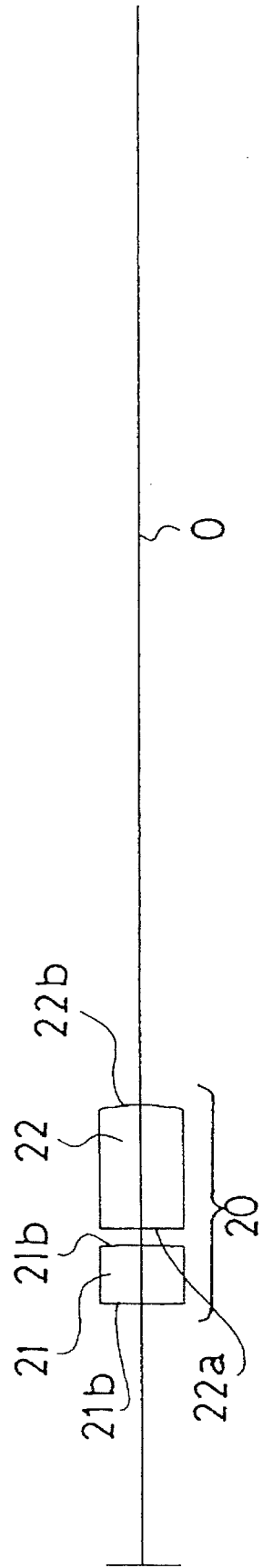
FIG. 26 is a front view of the scanning optical system shown in FIG. 25

FIGS. 25 and 26 show the seventh embodiment of the present invention. In this embodiment, the arrangement of lenses is the same as that of the third embodiment. The disposition of the aspherical surface of the plastic lens 21 is also the same as the third embodiment. The numerical values of the seventh embodiment are shown in Table 7, the fθ characteristic in FIG. 27, and the curvature of field in FIG. 28.

TABLE 7

| | f = 134.85 | | | |
| | $f_B$ = 130.59 | | | |
| | scanning coefficient = 135.5 | | | |
| Surface No. | R | Rz | D | N |
| polygonal mirror 12 | | | 31.135 | |
| 1** | −1000.000 | −1000.000 | 7.000 | 1.48617 |
| 2* | −129.737 | −129.737 | 2.000 | |
| 3 | ∞ | ∞ | 15.00 | 1.51072 |
| 4 | −118.627 | −19.215 | 129.876 | |

*indicates an aspherical surface which is rotationally symmetrical about the optical axis.
**indicates an aspherical surface which is not rotationally symmetrical about the optical axis.

The second surface 21b has the coefficients:

$AK=-0.1285$, $A4=-7.87744\times10^{-7}$, $A6=-3.23237\times10^{-11}$ $A8=-2.51458\times10^{-14}$, $A10=1.92610\times10^{-16}$ as defined with regard to equation (5).
The first surface 21a has the coefficients:

$BK=0$, $B4=-1.33393\times10^{-8}$, $B6=2.30451\times10^{-10}$, $B8=3.36174\times10^{-18}$, $B10=-1.83217\times10^{-17}$ $C1=-8.50417\times10^{-5}$, $C2=-3.83254\times10^{-6}$, $C3=4.79992\times10^{-0}$, $C4=2.49312\times10^{-8}$, $C5=1.50681\times10^{-11}$, $C6=-4.86840\times10^{-12}$ as defined with regard to equations (6a) and (6b).

As can be seen from the foregoing, according to a scanning optical system to which the present invention is applied, using the combination of a glass lens and a plastic lens, imaging with a high resolution can be realized, a deviation of the focal point can be minimized, and the cost of production can be lowered.

Eighth Embodiment

Figure 31:
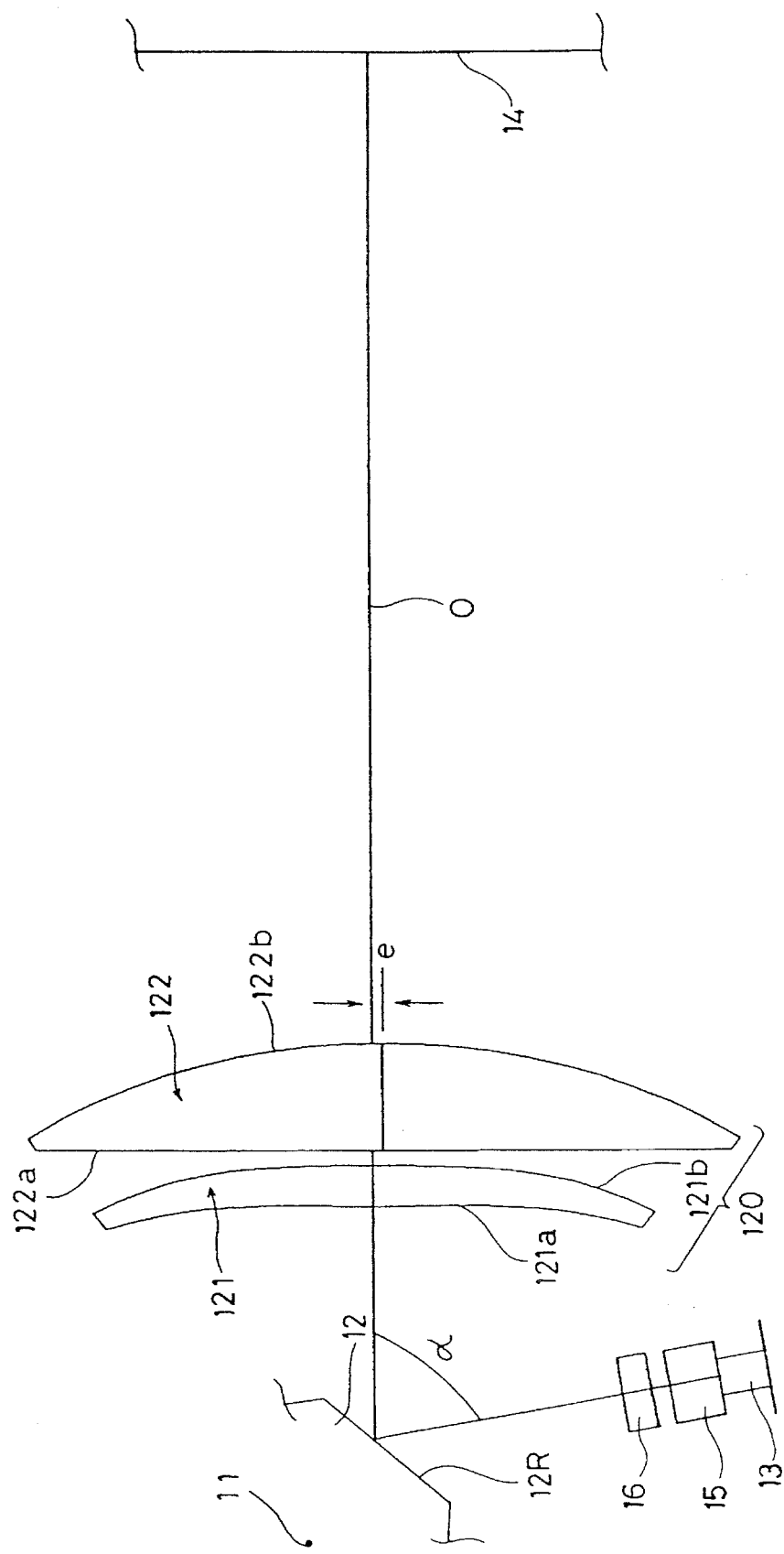
FIG. 31 is a plan view of a scanning optical system according to the eighth embodiment of the present invention.

FIGS. 31 and 32 show the configuration of the scanning optical system according to the eighth embodiment of the present invention. In the eighth embodiment, the light deflected by each reflection surface 12R passes through a scanning lens system 120 consisting of a plastic toric lens 121 and a glass toric lens 122 to scan the scanning surface 14.

In the eighth embodiment, as shown in FIGS. 31 and 32, the plastic toric lens 121 and the glass toric lens 122 are placed along the optical axis O in this order from the side of the polygonal mirror 12.

The glass toric lens 122 is responsible for the principal power of the scanning lens system 120 in the main and sub-scanning directions and is also able to correct the curvature of field of the scanning lens system 120 in the sub-scanning direction. The glass toric lens 122 has a third surface 122a adjacent to the plastic lens 121 and a fourth surface 122b adjacent to the scanning surface 14. The third surface 122a is formed as a negative cylindrical surface, and the fourth surface 122b is formed as a positive toric surface having a rotational axis (not shown) substantially parallel to the sub-scanning direction.

Figure 39:
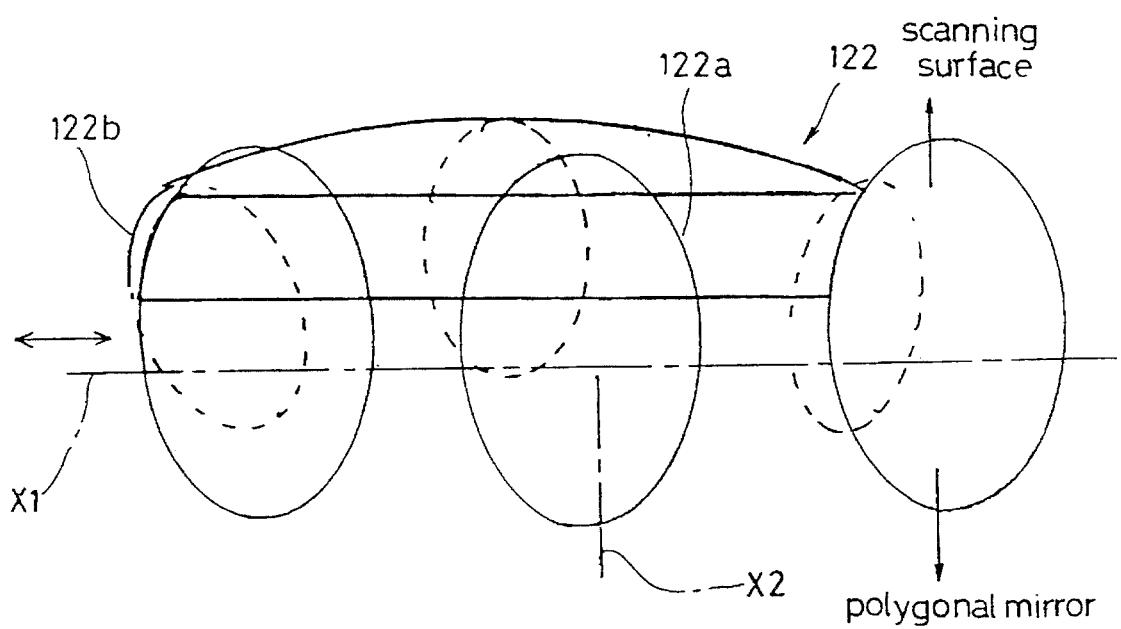
FIG. 39 is an illustration illustrating the shape of the glass toric lens shown in FIGS. 31 and 32.

FIG. 39 illustrates the shape of the glass toric lens 122. In the case where the horizontal direction of FIG. 39 is the main scanning direction, the third surface 122a is a negative cylindrical surface which is parallel to an axis X1 parallel to the main scanning direction. The closer the point on the third surface 122a at which a beam of light is incident is to the edge of the third surface 122a, the smaller the incident angle of the beam of light to the third surface 122a is. The negative power is accordingly large. As a result, the closer a beam of light incident upon the third surface 122a is to the edge of the third surface 122a, the longer the focal length is. Accordingly, the curvature of field in the sub-scanning direction can be corrected.

The fourth surface 122b of the glass toric lens 122 is formed as a positive toric surface having a rotational axis X2 substantially parallel to the sub-scanning direction.

As shown in FIG. 31, the plastic toric lens 121 has a first surface 121a adjacent to the polygonal mirror 12 and a second surface 121b adjacent to the glass lens 122. The first surface 121a has a positive power in the main scanning direction and is formed as a toric surface having a rotational axis (not shown) substantially parallel to the main scanning direction. Likewise, the second surface 121b has a positive power in the main scanning direction and is formed as a toric surface having a rotational axis (not shown) substantially parallel to the main scanning direction. Due to the first and second surfaces 121a and 121b, the plastic toric lens 121 is also able to correct the curvature of field of the scanning lens system 120 in the sub-scanning direction. Thus, the plastic toric lens 121 is able to correct the curvature of field of the scanning lens system 120 in the sub-scanning direction in combination with the fourth surface 122b of the glass toric lens 122.

The fθ characteristic and the curvature of field in the main scanning direction can be corrected by forming a surface of the plastic toric lens 21 along the main scanning direction as an aspherical surface.

As shown in FIG. 31, the center of the glass toric lens 122 is shifted away from the optical axis O by a distance "e" toward the side of the cylindrical lens 16. This arrangement in which the center of the glass toric lens 122 is shifted in such a manner as noted above corrects the image plane along the sub-scanning direction from being asymmetrical with respect to the center of the main scanning direction, i.e., from inclining towards the main scanning direction. The degree of this asymmetry is enhanced by a great amount once the incident angle α of the laser beam emitted from the semiconductor laser 13 surpasses a certain degree.

Figure 34:
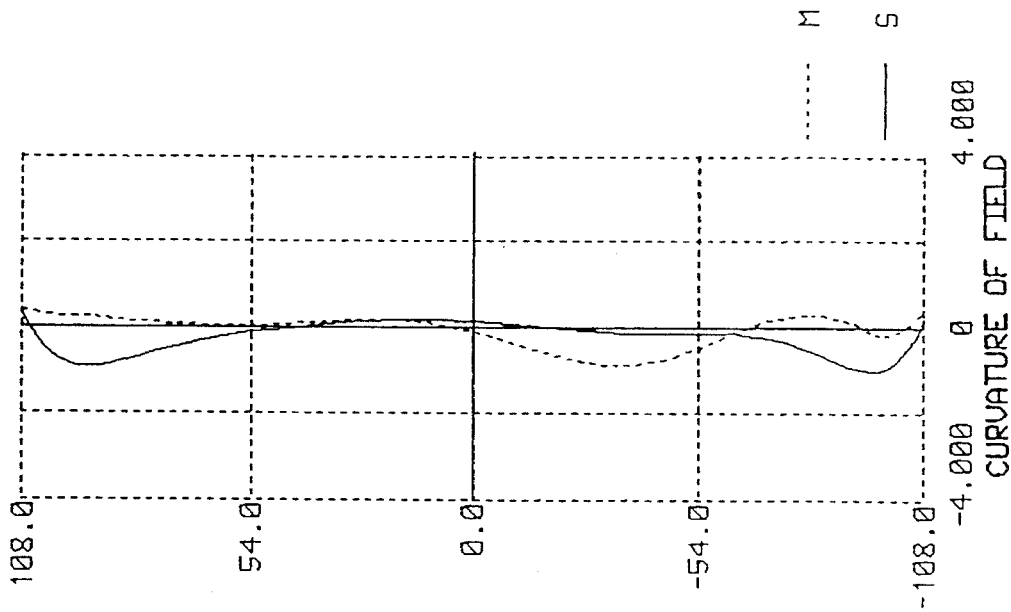
FIG. 34 is a graph showing the curvature of field in the scanning optical system illustrated in FIGS. 31 and 32.
Figure 33:
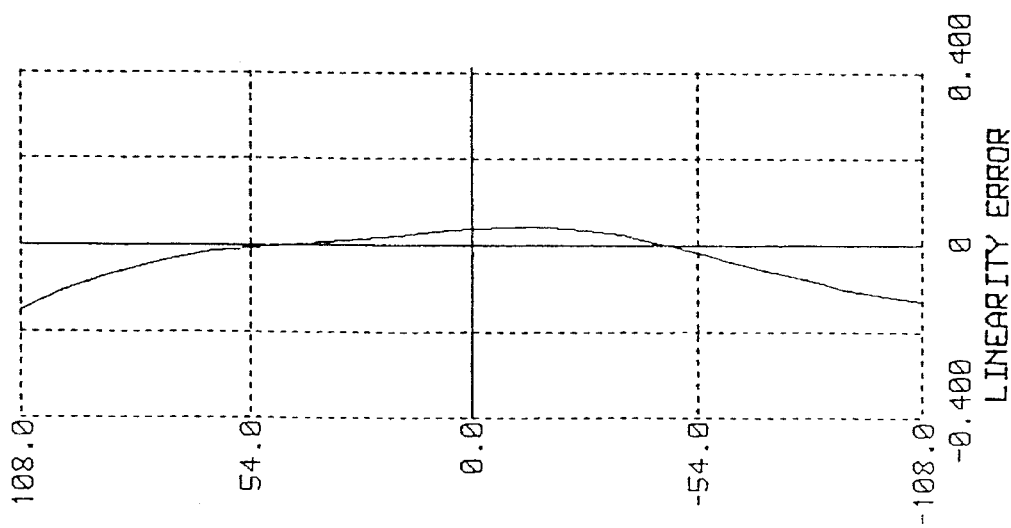
FIG. 33 is a graph showing the fθ characteristic in the scanning optical system illustrated in FIGS. 31 and 32.

Table 8 shows the specific numerical values of the eighth embodiment, and FIG. 33 is a graph showing the result of measuring the fθ characteristic of the scanning lens system 120 having the specific numerical values shown in Table 8. FIG. 34 shows a graph showing the result of measuring the curvature of field in the scanning optical system 120 in the meridional section M (i.e., main-scanning direction) and in the sagittal section S (i.e., sub-scanning direction). In FIGS. 33 and 34, the vertical line shows the position in the main-scanning direction. In FIG. 33, the horizontal line shows the displacement of the image height with respect to the ideal image height (mm). In FIG. 34, the horizontal line shows the displacement of the image plane with respect to the ideal image plane (mm).

TABLE 8 f = 135.39
$f_B$ = 131.54
scanning coefficient = 135.5

| Surface No. | R | Rz | D | N |
|---|---|---|---|---|
| cylindrical lens 13 | ∞ | 17.88 | 4.00 | 1.51072 (glass) |
|  | ∞ |  | 33.50 |  |
| polygonal mirror 12 |  |  | 31.50 |  |
| 1* | 536.10 | −50.00 | 5.46 | 1.48617 (plastic) |
| 2* | −385.76 | 180.60 | 2.00 |  |
| 3 | ∞ | −70.00 | 14.50 | 1.51072 (glass) |
| 4 | −95.00 | −13.56 | 131.54 |  |

*indicates a toric surface whose surface in the main scanning direction is formed as an aspherical surface.

The first surface 121a has the coefficients:

$K=5.20, A4=-4.540\times10^{-6}, A6=1.882\times10^{-9}, A8=-2.910\times10^{-12}$ The second surface 121b has the coefficients:

$K=22.00, A4=-3.250\times10^{-6}, A6=7.220\times10^{-10},$

The deviation amount "e" of the glass toric lens 122 is 1.36 mm. The deviation of the image plane (see FIG. 34) is −1.00 mm.

The aspherical first and second surfaces are defined by the above-noted equation (5).

Ninth Embodiment

Figure 37:
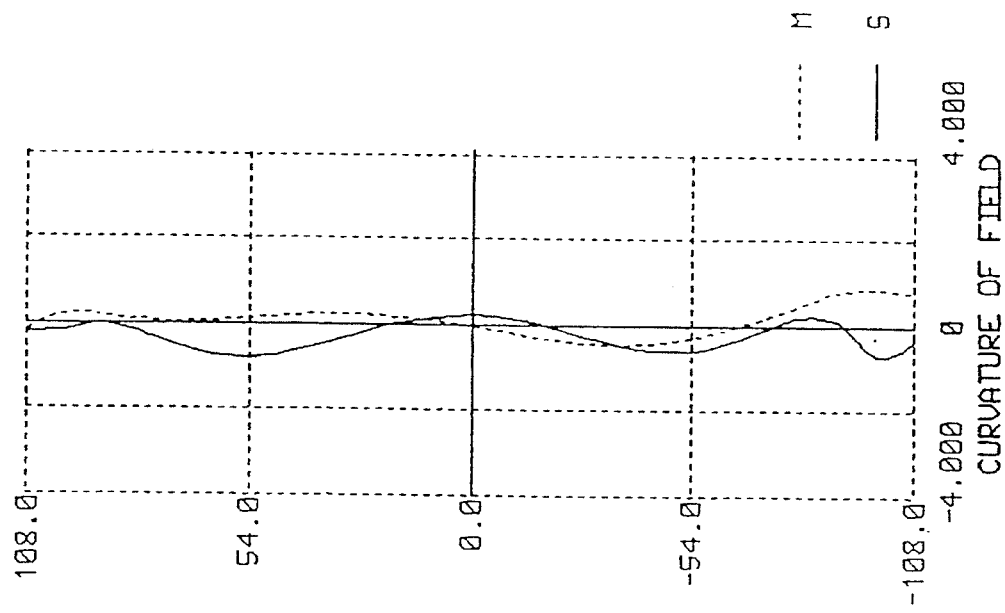
FIG. 37 is a graph showing the fθ characteristic in the scanning optical system illustrated in FIGS. 35 and 36.
Figure 38:
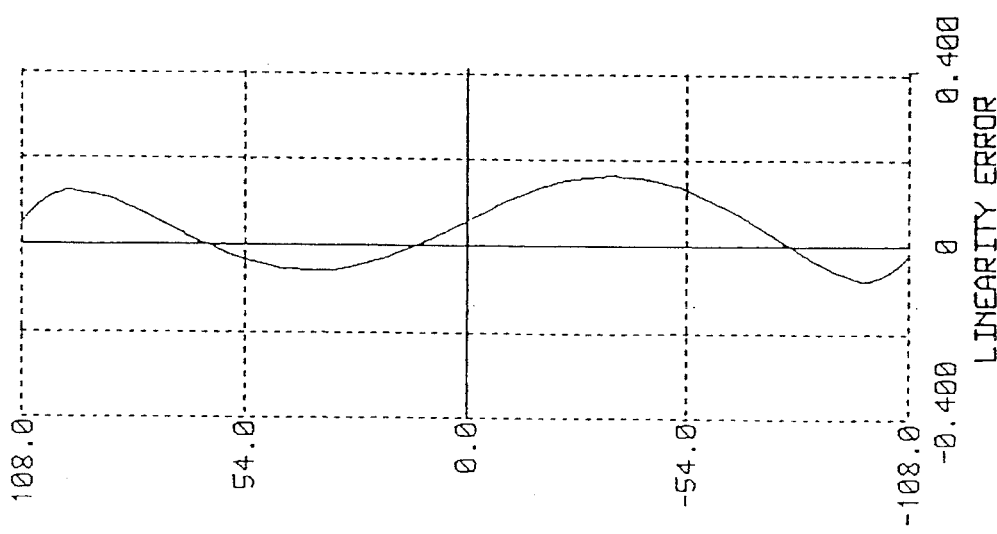
FIG. 38 is a graph showing the curvature of field in the scanning optical system illustrated in FIGS. 35 and 36.

FIGS. 35 and 36 show the ninth embodiment of the present invention. In this embodiment, the positions of the plastic toric lens 121 and the glass toric lens 122 are reversed as compared with those in the eighth embodiment. Due to this arrangement in which the positions of the plastic toric lens 121 and the glass toric lens 122 are reversed, the shapes of the first and second surfaces 121a and 121b of the plastic toric lens 121 in their circumferential portions are quite different from those in the eighth embodiment. Table 9 shows the specific numerical values of the ninth embodiment, and the FIG. 37 is a graph showing the result of measuring the fθ characteristic of the scanning lens system 120 having the specific numerical values shown in Table 9. FIG. 38 shows a graph showing the result of measuring the curvature of field in the scanning optical system 120 in the meridional section M (i.e., main-scanning direction) and in the sagittal section S (i.e., sub-scanning direction). In FIGS. 37 and 38, the vertical line shows the position in the main-scanning direction. In FIG. 37, the horizontal line shows the displacement of the image height with respect to the ideal image height (mm). In FIG. 38, the horizontal line shows the displacement of the image plane with respect to the ideal image plane (mm).

TABLE 9 f = 134.85
$f_B$ = 128.80
scanning coefficient = 135.5

| Surface No. | R | Rz | D | N |
|---|---|---|---|---|
| cylindrical lens 13 | ∞ | 17.88 | 4.00 | 1.51072 (glass) |
|  | ∞ |  | 58.40 |  |
| polygonal mirror 12 |  |  | 34.90 |  |
| 1 | ∞ | −16.88 | 14.00 | 1.51072 (glass) |
| 2 | −88.70 | −13.52 | 2.00 |  |
| 3* | 366.30 | −13.50 | 7.00 | 1.48617 (plastic) |
| 4* | −1342.00 | −13.32 | 128.80 |  |

*indicates a toric surface whose surface in the main scanning direction is formed as an aspherical surface.

The third surface 122a has the coefficients:

$K=5.20, A4=-8.800\times10^{-9}, A6=1.870\times10^{-10}, A8=8.730\times10^{-15}$ The fourth surface 122b has the coefficients:

$K=-52.00, A4=-6.520\times10^{-9}, A6=8.200\times10^{-11}, A8=2.690\times10^{-14}$ The deviation Mount "e" of the glass toric lens 122 is 0.57 mm. The deviation of the image plane (see FIG. 38) −0.50 mm.

The aspherical first and second surfaces are defined by the above-noted equation (5).

Table 10 below shows the numerical values in the above conditional formulas (2) and (4) in the case of the eighth and ninth embodiments.

TABLE 10

|  | Eighth Embodiment | Ninth Embodiment |
|---|---|---|
| "D4/f" in Conditional Formula (2): | 0.972 | 0.955 |
| "f/$f_F$" in Conditional Formula (4): | −1.694 | 0.901 |

Both the eighth and ninth embodiments satisfy the above two conditional formulas (2) and (4).

As can be seen from the foregoing, according to a scanning optical system to which the present invention is applied, the curvature of field in the sub-scanning direction can be effectively corrected by the negative cylindrical surface of the glass toric lens and the toric surface of the plastic toric lens. The curvature of field in the main scanning direction can be corrected by the aspherical surface of the plastic toric lens. The toric surface of the plastic toric lens can be formed in an accurate shape with a low cost of production since the toric surface is formed as an aspherical surface having a rotational axis substantially parallel to the main scanning direction. Furthermore, the scanning optical system in which the deviation of the focal length due to a variation An temperature and/or humidity is low can be obtained with a low cost of production since the glass toric lens is responsible for the principal power of the scanning lens system while the plastic toric lens corrects the curvature of field and the fθ characteristic. Moreover, a long back focal length can be obtained according to the present invention.

I claim:

1. A scanning optical system in which a beam of light deflected by a light deflector scans a scanning surface along a main scanning direction through a scanning lens system, said scanning lens system comprising:

an anamorphic lens made of glass which has a positive power in both said main scanning direction and a sub-scanning direction perpendicular to said main scanning direction, said positive power in said sub-scanning direction being larger than said positive power in said main scanning direction; and a plastic lens wherein said plastic lens has a positive power in said main scanning direction.

2. The scanning optical system of claim 1, wherein said plastic lens is formed to have an aspherical surface in said main scanning direction.

3. The scanning optical system of claim 1, wherein said glass lens is a toric lens having a toric surface, wherein the shape of said toric surface is defined by an arc of a circle in said sub-scanning direction which is rotated about an axis which lies in a plane of said circle where said axis points in said sub-scanning direction, said toric surface being convex in said main and sub-scanning directions towards said scanning surface.

4. The scanning optical system of claim 1, wherein the following formula is satisfied:

$$-0.4 < f_G/f_P < 0.4,$$

wherein "$f_G$" represents a focal length of said glass lens along said sub-scanning direction in the vicinity of an optical axis of said glass lens, and "$f_p$" represents a focal length of said plastic lens along said sub-scanning direction in the vicinity of an optical axis of said plastic lens.

5. The scanning optical system of claim 1, wherein at least one surface of said plastic lens is an aspherical surface which is not rotationally symmetrical about an optical axis, said aspherical surface being formed in a manner such that a radius of curvature of said aspherical surface along said sub-scanning direction apart from said optical axis is independent of the shape of said aspherical surface along said main scanning direction.

6. A scanning optical system in which a beam of light deflected by a light deflector scans a scanning surface along a main scanning direction through a scanning lens system, said scanning lens system comprising:

a toric lens which is made of glass and includes a first surface facing said light deflector and a second surface facing said scanning surface, wherein said first surface is formed as a negative cylindrical surface and said second surface is formed as a positive toric surface having a rotational axis parallel to a sub-scanning direction perpendicular to said main scanning direction; and a toric lens which is made of plastic, both surfaces of said toric lens having a rotational axis parallel to said main scanning direction.

7. The scanning optical system of claim 6, wherein said plastic toric lens has an aspherical surface along said main scanning direction.

8. The scanning optical system of claim 6, wherein the following conditional formula is satisfied:

$$0.6 < D4/f,$$

wherein "f" represents a focal length of said scanning lens system, and "D4" represents a distance between said scanning surface and a surface adjacent to said scanning surface of either said glass toric lens or said plastic toric lens.

9. The scanning optical system of claim 6, wherein the following conditional formula is satisfied $$-2 < f/f_p < 2$$

wherein "$f_p$" represents a focal length of said plastic toric lens along said sub-scanning direction.

10. The scanning optical system of claim 6, wherein said plastic toric lens and said glass toric lens are aligned along an optical axis in this order from a side of said light deflector.

11. The scanning optical system of claim 6, wherein said glass toric lens and said plastic toric lens are aligned along an optical axis in this order from a side of said light deflector.

12. A scanning optical system in which a beam of light deflected by a light deflector scans a scanning surface along a main scanning direction through a scanning lens system, said scanning lens system comprising:

an anamorphic lens made of glass; and a plastic lens;

wherein said anamorphic lens and said plastic lens have a positive power in said main scanning direction.

* * * * *

UNITED STATES PATENT AND TRADEMARK OFFICE
CERTIFICATE OF CORRECTION

PATENT NO.  : 5,541,760
DATED       : July 30, 1996
INVENTOR(S) : Takashi IIZUKA It is certified that error appears in the above-indentified patent and that said Letters Patent is hereby corrected as shown below:

At column 15, line 22 (claim 1, line 11), change "lens" to ---lens,---.

At column 16, line 15 (claim 6, line 13), after "said" insert ---plastic---.

At column 16, line 32 (claim 9, line 3), change "<2" to ---<2,---.

Signed and Sealed this

Eighteenth Day of March, 1997

Attest:

BRUCE LEHMAN

Attesting Officer

Commissioner of Patents and Trademarks